(12) United States Patent
Poindexter

(10) Patent No.: US 7,033,128 B2
(45) Date of Patent: Apr. 25, 2006

(54) DUMPING AND TRANSPORTING ACCESSORY HAVING A TELESCOPING LIFT WITH A PIVOT MOUNTED TROLLEY

(75) Inventor: David A. Poindexter, Stoughton, WI (US)

(73) Assignee: Howard H. Hanson, Jr., Mazomanie, WI (US)

( * ) Notice: Subject to any disclaimer, the term of this patent is extended or adjusted under 35 U.S.C. 154(b) by 377 days.

(21) Appl. No.: 10/427,073

(22) Filed: Apr. 30, 2003

(65) Prior Publication Data

US 2004/0018076 A1 Jan. 29, 2004

Related U.S. Application Data

(63) Continuation-in-part of application No. 10/001,620, filed on Oct. 23, 2001, now abandoned.

(60) Provisional application No. 60/242,933, filed on Oct. 24, 2000.

(51) Int. Cl.
B60P 1/43 (2006.01)

(52) U.S. Cl. .................. 414/544; 414/522; 414/541; 414/542; 414/812

(58) Field of Classification Search ............. 414/494, 414/500, 477–480, 538, 522, 541, 542, 544, 414/812
See application file for complete search history.

(56) References Cited

U.S. PATENT DOCUMENTS

| | | | |
|---|---|---|---|
| 1,336,163 A | 4/1920 | Settlage | |
| 1,755,803 A | 4/1930 | Anthony | |
| 2,033,209 A | 3/1936 | Teetor | |
| 2,082,663 A * | 6/1937 | Slater | 414/477 |
| 2,529,558 A | 11/1950 | Klingbiel | |
| 2,590,285 A | 3/1952 | Wiltshire | |
| 2,621,814 A | 12/1952 | Lisota | |
| 2,901,262 A | 8/1959 | Berlin | |
| 2,911,118 A | 11/1959 | Tapp | |
| 3,055,709 A | 9/1962 | Kirkwood | |
| 3,064,834 A | 11/1962 | Dempster et al. | |
| 3,074,574 A * | 1/1963 | Prince | 414/477 |
| 3,147,999 A | 9/1964 | Daniels | |
| 3,326,605 A | 6/1967 | Steingas et al. | |
| 3,381,835 A | 5/1968 | Lee | |
| 3,411,825 A | 11/1968 | Fulton | |
| 3,446,534 A | 5/1969 | King | |
| 3,450,437 A | 6/1969 | McQueen | |
| 3,620,391 A | 11/1971 | Fujioka | |
| 3,630,571 A | 12/1971 | Saldana | |
| 3,740,097 A | 6/1973 | Parker et al. | |

(Continued)

FOREIGN PATENT DOCUMENTS

CA 851025 9/1970

(Continued)

Primary Examiner—Thomas J. Brahan

(57) ABSTRACT

Transport accessories useable with a vehicle for supporting cargo and a method of loading cargo onto a transport accessory useable with a vehicle. In one embodiment, the transport accessory includes a base frame connectable to the vehicle, a second frame slidably connected to the base frame and movable between a retracted position and an extended position relative to the base frame, a carriage pivotally connected to the second frame and pivotable between a substantially horizontal position and an inclined position relative to the second frame, a support frame rigidly connected to the carriage and pivotal therewith between the substantially horizontal position and the inclined position and a transport platform slidably connected to the support frame and slidable between a retracted position and an extended position relative to the support frame. Cargo is loadable on and unloadable from the transport platform when the transport platform is in the extended position.

30 Claims, 18 Drawing Sheets

U.S. PATENT DOCUMENTS

| | | | |
|---|---|---|---|
| 3,807,592 A | 4/1974 | Lynn et al. | |
| 3,856,168 A * | 12/1974 | Mauck | 414/478 |
| 3,915,496 A | 10/1975 | Mabry, Jr. | |
| 4,023,690 A | 5/1977 | Goode | |
| 4,039,096 A | 8/1977 | McAllister | |
| 4,081,095 A | 3/1978 | Wilburn et al. | |
| 4,084,851 A | 4/1978 | Duncan, Sr. | |
| 4,236,854 A | 12/1980 | Rogers | |
| 4,251,178 A | 2/1981 | Bourgraf et al. | |
| 4,260,314 A | 4/1981 | Golze | |
| 4,278,387 A | 7/1981 | Seguela et al. | |
| 4,297,071 A | 10/1981 | Dunbar | |
| 4,354,791 A | 10/1982 | Antonellis | |
| 4,418,959 A | 12/1983 | Dunlap | |
| 4,428,631 A | 1/1984 | Cope et al. | |
| 4,456,420 A * | 6/1984 | Newhard | 414/478 |
| 4,565,482 A | 1/1986 | Baker | |
| 4,573,854 A | 3/1986 | McFarland | |
| 4,596,347 A | 6/1986 | Hite | |
| 4,621,972 A | 11/1986 | Grotte | |
| 4,647,110 A | 3/1987 | McKee | |
| 4,655,671 A * | 4/1987 | Pratt | 414/477 |
| 4,681,371 A | 7/1987 | Leonard | |
| 4,728,244 A | 3/1988 | Stokkendal | |
| 4,778,327 A | 10/1988 | Tufenkian et al. | |
| 4,790,713 A | 12/1988 | Miller | |
| 4,834,599 A | 5/1989 | Gordon et al. | |
| 4,842,470 A * | 6/1989 | Hubbard | 414/478 |
| 4,932,829 A | 6/1990 | Miller | |
| 4,943,203 A * | 7/1990 | Bohata | 414/486 |
| 4,950,123 A | 8/1990 | Brockhaus | |
| 5,018,651 A | 5/1991 | Hull et al. | |
| 5,096,361 A | 3/1992 | Crawford | |
| 5,110,252 A | 5/1992 | Aoki | |
| 5,183,372 A | 2/1993 | Dinverno | |
| 5,192,189 A | 3/1993 | Murata et al. | |
| 5,209,628 A | 5/1993 | Hassell | |
| 5,246,329 A * | 9/1993 | Farrell | 414/478 |
| 5,267,779 A | 12/1993 | Talamantez, Jr. et al. | |
| 5,326,216 A * | 7/1994 | Russ | 414/563 |
| 5,360,259 A | 11/1994 | Lemberger | |
| 5,447,361 A | 9/1995 | Phillips | |
| 5,454,684 A | 10/1995 | Berens | |
| 5,556,249 A * | 9/1996 | Heine | 414/500 |
| 5,618,150 A | 4/1997 | Poindexter | |
| 5,630,638 A | 5/1997 | Hirasawa et al. | |
| 5,636,902 A | 6/1997 | Norbury | |
| 5,649,655 A | 7/1997 | Kerner | |
| 5,651,657 A | 7/1997 | Poindexter | |
| 5,730,577 A * | 3/1998 | Jones | 414/462 |
| 5,738,261 A | 4/1998 | Dula | |
| 5,788,135 A | 8/1998 | Janek | |
| 5,806,737 A | 9/1998 | Clark | |
| 5,967,736 A | 10/1999 | Poindexter | |
| 6,019,567 A * | 2/2000 | Lutkus et al. | 414/549 |
| 6,086,315 A | 7/2000 | Poindexter et al. | |
| 6,099,232 A * | 8/2000 | Dixon et al. | 414/494 |
| 6,149,372 A * | 11/2000 | Lee et al. | 414/538 |
| 6,176,672 B1 | 1/2001 | Egan et al. | |

FOREIGN PATENT DOCUMENTS

| | | |
|---|---|---|
| CA | 2161159 | 4/1997 |
| DE | 3633-862 | 9/1988 |
| FR | 2619-768 A | 3/1989 |
| GB | 2105296 | 3/1983 |
| JP | 63-219434 | 9/1988 |

\* cited by examiner

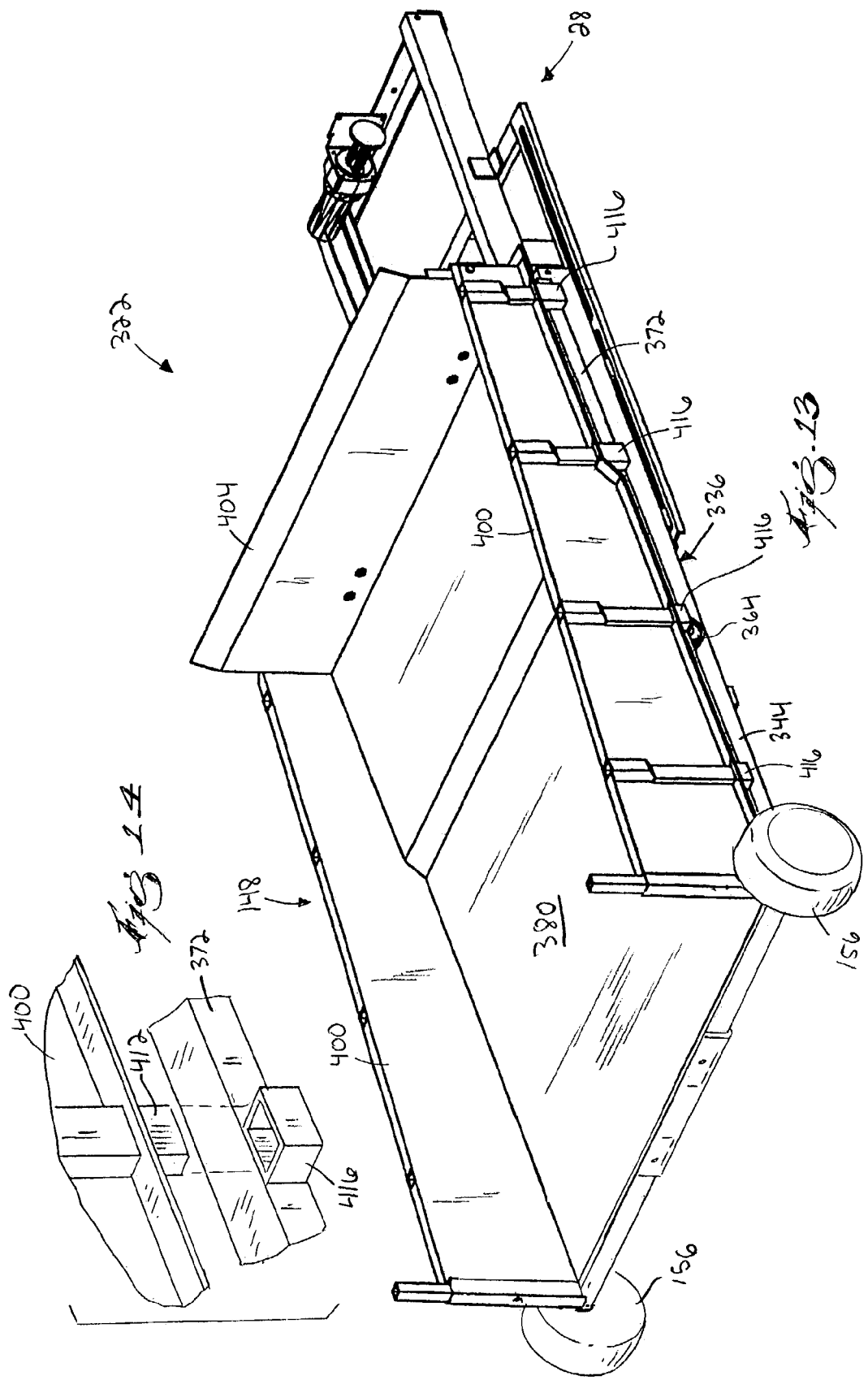

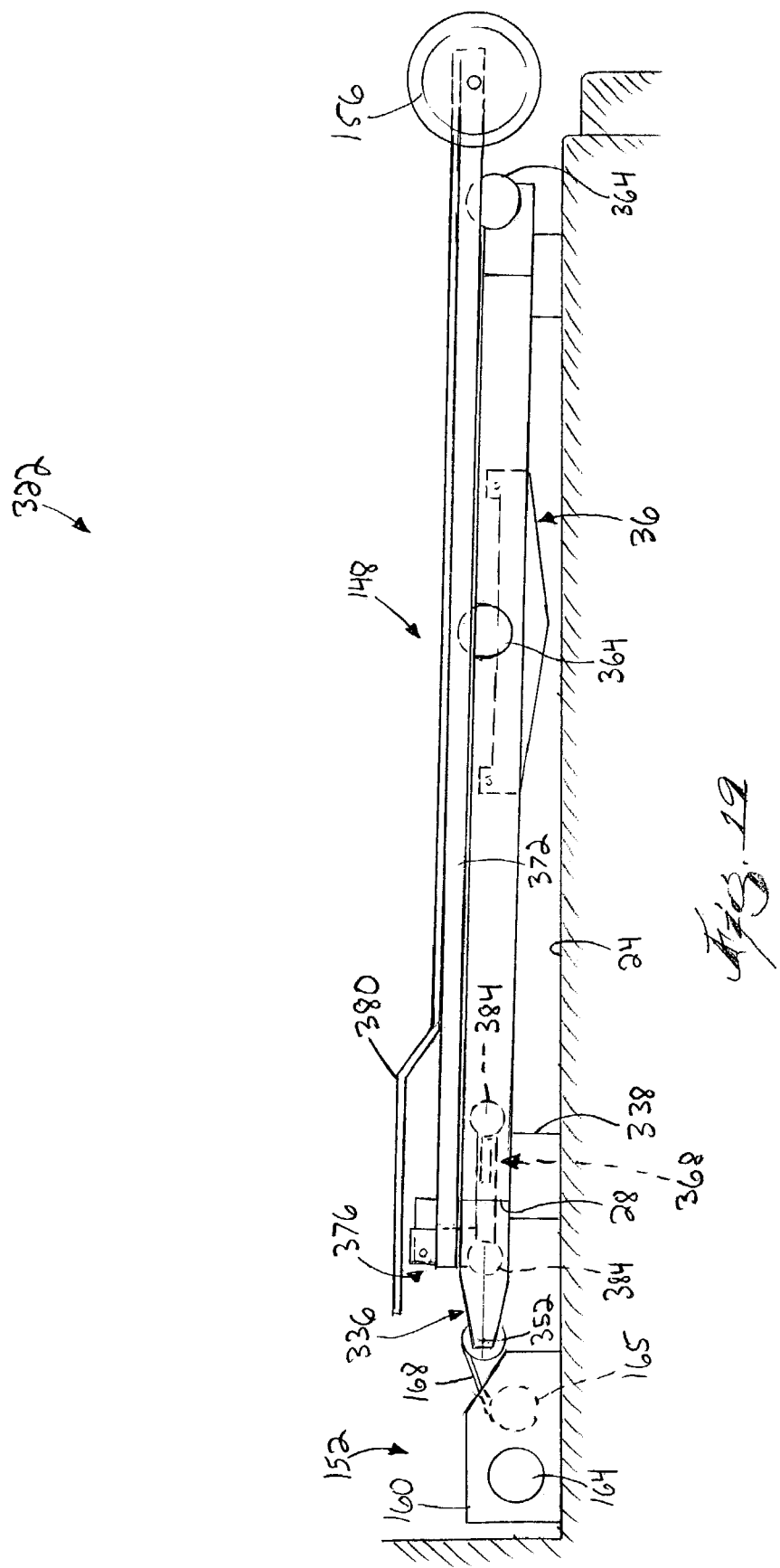

DUMPING AND TRANSPORTING ACCESSORY HAVING A TELESCOPING LIFT WITH A PIVOT MOUNTED TROLLEY

RELATED APPLICATIONS

This application is a continuation-in-part of prior-filed, U.S. application Ser. No. 10/001,620 filed Oct. 23, 2001 now abandoned, which claims the benefit of prior-filed, provisional patent application Ser. No. 60/242,933, filed Oct. 24, 2000, the entire contents of both applications are hereby incorporated by reference.

FIELD OF THE INVENTION

The present invention relates to a dumping and transporting accessory for vehicles. More particularly, the present invention relates to an accessory that facilitates the loading and unloading of material and devices into and out of a vehicle.

BACKGROUND OF THE INVENTION

It is known in the art to provide auxiliary transporting devices for pick-up trucks and other vehicles to allow for the unloading of material such as dirt, rocks, or the like from the bed of the trucks. It is also known to provide devices to facilitate the loading and unloading of equipment and other items from vehicles.

Even so, such devices are often difficult to attach and detach from the vehicle, only attach to one size of vehicle, are difficult and dangerous to operate, or have an uncontrolled dumping action that can damage the articles or items being transported, the vehicle, the auxiliary device, or a combination of the above.

SUMMARY OF THE INVENTION

Accordingly, there is a need for an improved dumping and transporting accessory for a vehicle. The present invention provides such an accessory. In some aspects and in some embodiments, the present invention provides a transport accessory useable with a vehicle for supporting cargo. The transport accessory includes a base frame connectable to the vehicle, a second frame slidably connected to the base frame and movable between a retracted position and an extended position relative to the base frame, a carriage pivotally connected to the second frame and pivotable between a substantially horizontal position and an inclined position relative to the second frame, a support frame rigidly connected to the carriage and pivotal therewith between the substantially horizontal position and the inclined position, and a transport platform slidably connected to the support frame and slidable between a retracted position and an extended position relative to the support frame. The transport platform is substantially horizontal when in the extended position and is operable to support cargo thereon. The cargo is loadable on and unloadable from the transport platform when the transport platform is in the extended position.

Also, in some aspects and in some embodiments, the present invention provides a transport accessory useable with a vehicle for supporting cargo. The transport accessory has a retracted position, in which the cargo is transportable, and an extended position, in which the cargo is loadable on and unloadable from the transport accessory. The transport accessory includes a base frame connectable to the vehicle, a second frame connected to the base frame and movable therealong, a support frame pivotally connected to the second frame and including first and second pulleys, a transport platform connected to the support frame and movable therealong. The transport platform includes a third pulley. The transport accessory also includes a drive operable to move the transport accessory between the retracted position and the extended position. The drive includes a drum and a cable windable and unwindable around the drum. The cable extends from the drum and engages the first, second, and third pulleys.

Further, in some aspects and in some embodiments, the present invention provides a method of loading cargo onto a transport accessory useable with a vehicle. The method includes mounting a base frame of the transport accessory to the vehicle, and extending the transport accessory from a retracted position, in which a second frame is substantially nested with the base frame, a carriage and a support frame rigidly connected to one another and rotatable together are in a substantially horizontal position relative to the second frame, and a transport platform is substantially positioned over the support frame, to an extended position, in which the second frame is telescopically extended from the base frame, the carriage and support frame are similarly inclined relative to the second frame and the transport platform is telescopically extended from the support frame. Another step of the method is loading the transport platform with the cargo.

Other features of the invention are set forth in the attached drawings, detailed description, and claims.

BRIEF DESCRIPTION OF THE DRAWINGS

FIG. 13 is a right perspective view of a transport platform of the device of FIG. 10.

FIG. 14 is an enlarged, partial right perspective view of a portion of the transport platform of FIG. 13.

FIG. 19 is a left elevation schematic of the device of FIG. 10, shown in the retracted position.

DETAILED DESCRIPTION OF THE INVENTION

Figure 1:
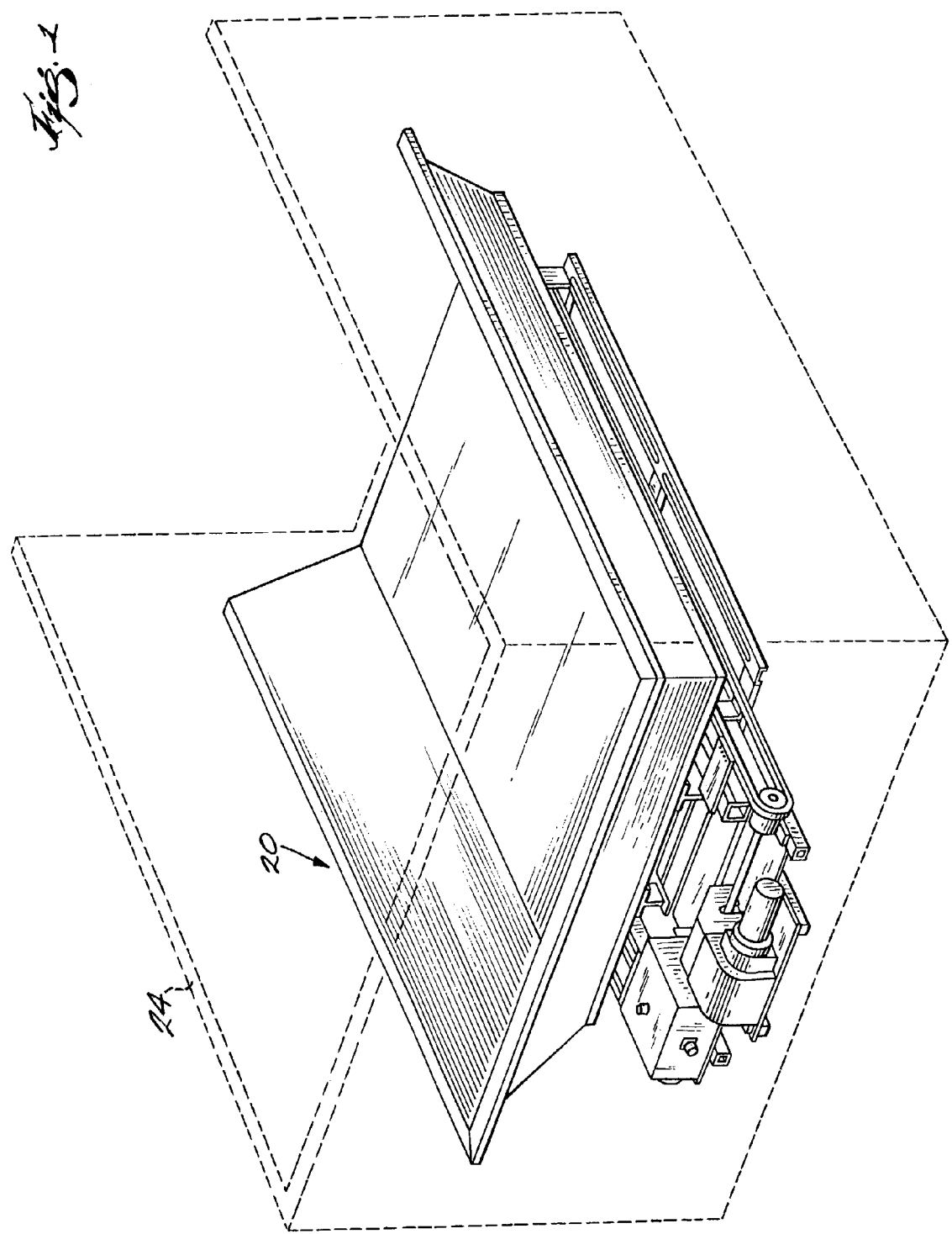
FIG. 1 is a perspective view of one embodiment of a dumping and transporting accessory device of the invention.

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling.

FIG. 1 illustrates a dumping and transporting accessory or device 20. Devices similar to the device 20 are often generically referred to as lifts. In FIG. 1, the device 20 is shown in a first or retracted position. The device 20 is mountable to a vehicle 24. In the embodiment shown, the device 20 is configured to fit in a pick-up truck or similar vehicle. However, the device 20 could be mounted on and find usefulness with a variety of overland and other vehicles.

Figure 2:
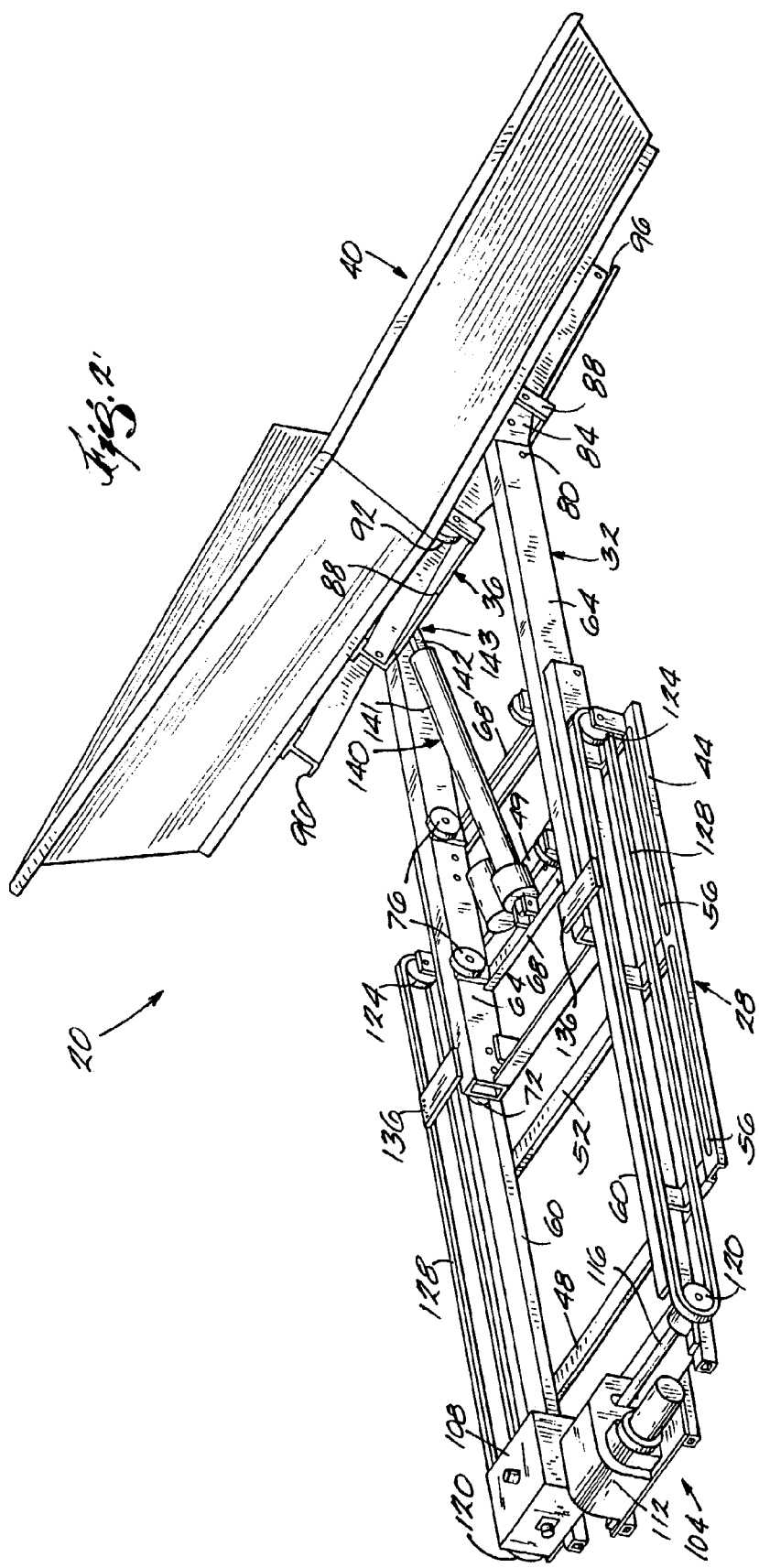
FIG. 2 is a second perspective view of the device of FIG. 1 in a dumping position.

As best seen by reference to FIG. 2, the device 20 includes a base frame 28, a second frame 32, a trolley or carriage 36, and a dump bed 40 (generically, a type of transport support). In FIG. 2, the device 20 is shown in a second extended position.

The base frame 28 is mountable to the vehicle 24 and includes longitudinal side beams 44 (one shown), end beams 48 and 49, and a lateral cross beam 52. The end beams 48 and 49 and cross beam 52 interconnect the side beams 44 and provide stability to the side beams 44. The side beams 44 have apertures 56 that fasteners (not shown) insert into to mount the device 20 to the vehicle 24. The base frame 28 also includes longitudinal support members 60 that are mounted to the end beams 48 and cross beams 52.

The second frame 32 telescopes with respect to and is extendably mounted to the base frame 28. The second frame 32 includes longitudinal extension members 64 and lateral support members 68 that interconnect the extension members 64. The second frame 32 also includes a plurality of guide rollers 72 (one shown) that engage the support members 60 of the base frame 28. The rollers 72 roll within the support members 60 and allow the extension members 64 to extend along the support members 60 until the rollers 72 contact a protrusion or stop (not shown) within each support member 60 to prevent further extending of the extension members 64. The second frame 32 also includes transport support rollers 76 mounted on the extension members 64 that the dump bed 40 rolls upon. One or more of the guide devices discussed below could be substituted for the transport support rollers 76.

Before discussing additional details of the device 20, it should be noted that the rollers and tracks discussed are just one way of achieving a sliding, telescoping interaction between components of the device. Interacting protrusions and grooves, bearings and guides, whether made from metals, composites, plastics or other materials, or coated or otherwise exploiting low-friction materials, and a variety of other devices could be used to provide telescoping interaction of components in the device 20 and are within the scope of the invention. The choice of such components is based in part on considerations of cost, the weight of the load to be handled, and the environment in which the device is operated.

The carriage 36 is pivotally mounted to the second frame 32 at pivots 80 (one shown) and include parallel longitudinal side arms 84, lateral support beams 88, and a plurality of dumping rollers 92 (one shown). Devices other than rollers could be mounted to the carriage 36, including guide devices such as protrusions, bearings, slides, and tracks. The support beams 88 interconnect and provide stability to the side arms 84. The dumping rollers 92 are rotatably mounted to the side arms 84. An important feature of the carriage 36 is its location at a single pivot point or axis (defined by the two pivots 80) located at a distal end of the extension members 64. This positioning allows the device to extend out of a bed or cargo area of a vehicle a sufficient distance to allow the transport support to telescope with respect to the carriage 36 and provide clearance from the vehicle's bed or cargo area to allow pivoting or dumping of the dump bed 40.

In the embodiment shown, the transport support is illustrated as a dump bed 40. However, the transport support could be a staked bed, a flat bed, a support bed having depressions for tires, snowmobile skis, or any other depressions depending on the item being transported, or another bed, bin, or cargo support designed to hold an item or load of interest. A transport support having apertures therein for tie downs, or any other suitable transport support could be used and is within the scope of the invention. The dump bed 40 is extendably mounted to the carriage 36 and includes a plurality of longitudinal dumping tracks 96. The dumping rollers 92 of the carriage 36 are engageable with and roll within the dumping tracks 96 to allow the dump bed 40 to extend until the dumping rollers 92 contact a stop (not shown) within the tracks 96 to prevent further extension of the dump bed 40. The dump bed 40 supports objects or cargo (not shown) that are to be transported by the vehicle 24.

The device 20 also includes a drive assembly 104 that extends and retracts the second frame 32 along the base frame 28. The drive assembly 104 includes a housing 108, a reversible motor 112, a drive shaft 116, drive gears 120, free turning gears 124, and drive chains 128. The drive assembly 104 can be mounted to the base frame 28 or to the interior of the vehicle 24. The drive assembly 104 can be powered by the vehicle's electric system or by a power source fitted on the vehicle along with the device 20 such as a battery (not shown). The motor 112 is supported within the housing 108 and can rotate the drive shaft 116 clockwise and counter clockwise depending on whether extension or retraction of the extension members 64 is desired. The drive gears 120 are mounted to each end of the drive shaft 116 and include a plurality of gear teeth (not shown). The gear teeth are interconnectable with the drive chains 128 that are wrapped around the drive gears 120. The free turning gears 124 are pivotally mounted to each side of the base frame 28 and each drive chain 128 wraps around a free turning gear 124. The second frame 32 includes brackets 136 that are mounted to each drive chain 128 and cause the extension members 64 to extend along the support members 60 depending on the direction of the drive chains 128.

The device 20 also includes an actuating mechanism 140 for rotating the carriage about pivots 80. This rotation causes the tracks 96 to slide or move with respect to the carriage 36 between a retracted position and an extended position. The actuating mechanism 140 may be any one of a number of different mechanisms such as electric or hydraulic linear actuators, rack and pinion systems, screws, or other devices, but is illustrated as an electric actuator 141 of conventional design. The electric actuator is connected in fluid flowing relation relative to a source of hydraulic fluid, under pressure (not shown). The electric actuator 141 includes a movable ram 142. The ram 142 has a distal end 143, which is connected by means of a pin (not shown), in pivotal force engaging relation relative to the support beams 88. The cylinder 141 is connected to the support member 68 by means of a pin (not shown). Since the support member 68 is mounted to the extension members 64 and is movable therewith, extension or retraction of the ram 142 causes the carriage 36 to rotate about pivots 80.

Extension of the ram 142 also causes the dump bed 40 to move with respect to the carriage 36. By extending the ram 142, the carriage 36 rotates and becomes inclined with respect to the second frame 32, therefore, causing the tracks 96 of the dump bed 40 to slide with respect to the carriage 36 by the force of gravity.

Having focused on the structural components of the device 20, its operation will now be described in greater detail.

The device 20 is in the retracted position, when the extension members 64 are retracted with respect to the support members 60. To extend the extension members 64 and move the device 20 to the extended position, the drive assembly 104 is activated. The motor 112 rotates the drive shaft 116 causing the drive gears 120 and drive chains 128 to move in a direction to extend the extension members 64 along the support members 60. After the extension members 64 are fully extended from the support members 60, the actuating mechanism 140 is actuated to extend the ram 142. The extension of the ram 142 causes the carriage 36 to rotate about the pivots 80, such that, the dump bed 40 is inclined with respect to the base and second frames 28 and 32. As the carriage 36 rotates about the pivots 80, the dumping tracks 96 slide on the dumping rollers 92. The rotating and sliding action of the dump bed 40 causes the objects supported by the dump bed 40 to be dumped therefrom. When the dump bed 40 is fully rotated and extended relative to the second frame 32, the dump bed 40 and dumping tracks 96 are in the extended position, and the device 20 is in the extended position. To return the device 20 to the retracted position, the actuating mechanism 140 is actuated and retracts the ram 142. The retracting of the ram 142 rotates the dump bed 40 about the pivots 80 so that the dump bed is generally parallel to the base and second frames 28 and 32. The dump bed 40 and dumping tracks also retract along the carriage 36 to move the dump bed 40 and dumping tracks 96 to the retracted position. The drive assembly 104 is reversed from the original direction and causes the extension members 64 to retract within the support members 60 until the extension members 64 are nested with respect to the support members 60.

Figure 3:
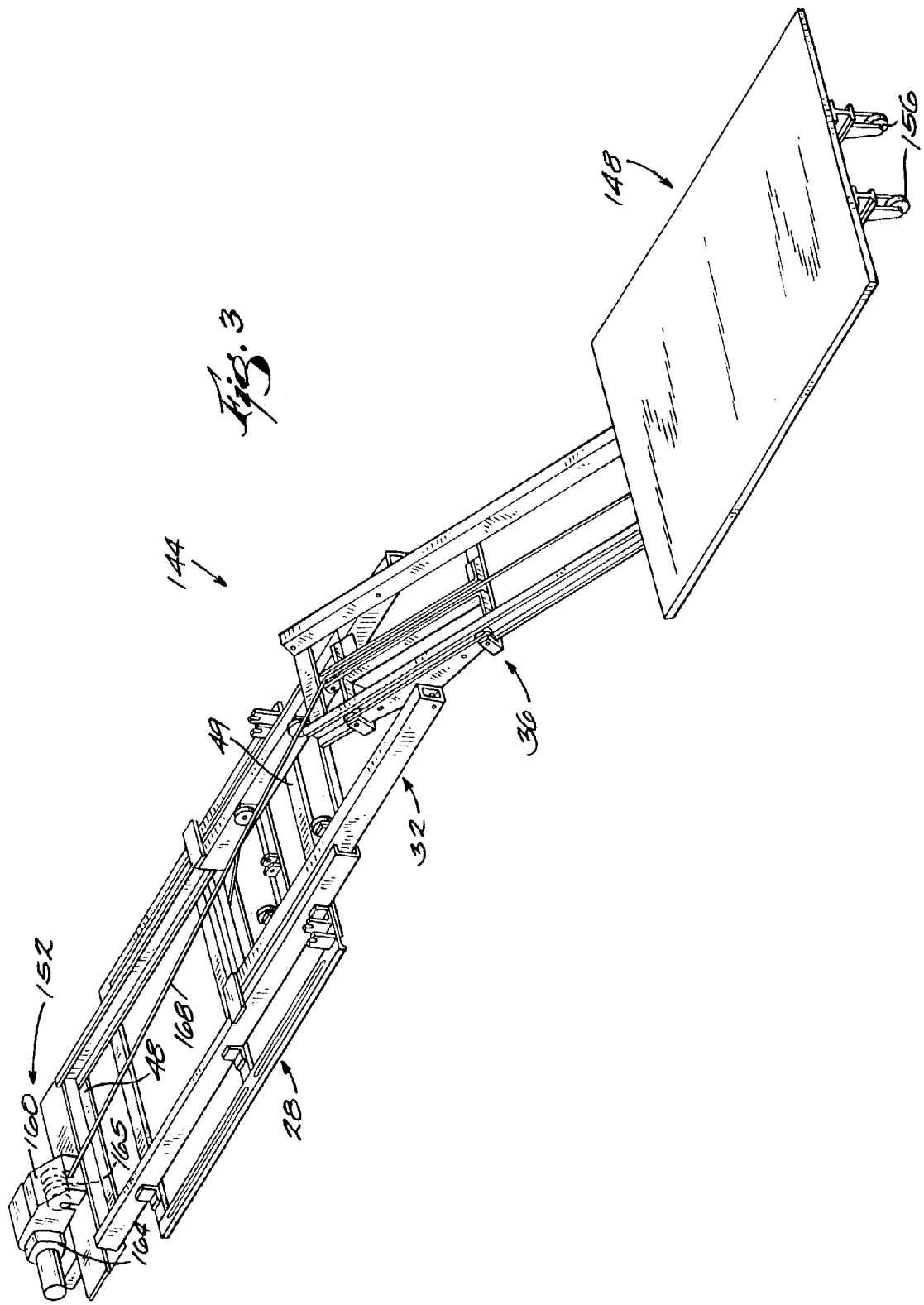
FIG. 3 is a perspective view of a second embodiment of the invention.

Referring to FIG. 3, another embodiment of the invention, a transporting accessory or transporting device 144, is illustrated. Many of the components in the alternate embodiment are similar to the components in the previous embodiment. Therefore, like components will be given like reference numbers.

The transporting device 144 includes a transport platform 148 instead of the dump bed 40, and a drive assembly 152 that controls the movement of the device 144 between a retracted position, wherein the extension members 64 and transport platform 148 are nested along the support members 60 and carriage 36, respectively, and an extended position, wherein the extension members 64 and transport platform 148 are extended along the support members 60 and the carriage 36, respectively. The device 144 is arranged at an angle within the vehicle 24 so that the end beam 48 of the base frame 28 is elevated with respect to the end beam 49. The angled arrangement may be achieved by mounting a shim or block under the end beam 48 such that there is angle of incline about 3 to 5° from the front to the rear of the device 144. Arrangement of the device 144 in such a manner, biases the device 144 and loads thereon (via gravity) toward the extended position.

The transport platform 148 is extendably mounted to the carriage 36 and includes rollers 156 that contact the ground. The rollers 156 allow the transport platform 148 to roll on the ground while moving with respect to the carriage 36. Although rollers are preferred, skids or other devices could also be used to facilitate motion of the transport platform 148 over an underlying surface. The transport platform 148, when fully extended, is generally parallel with the ground to facilitate the loading and unloading of objects onto the transport platform 148. This is an advantage over other lifts and loading devices, which are often designed such that the load or item to be transported must be inclined by the person operating the lift or manually moved into the bed or cargo area after the lift has moved the cargo to a vertical position roughly parallel to the height of the cargo area.

The drive assembly 152 can be mounted to the base frame 28 or the vehicle 24, and can be powered by the vehicle's electric system or by another power source such as a battery (not shown). The drive assembly 152 includes a housing 160 and a winch 164 with a drum 165 having a cable 168 wound thereon. The cable 168 has one end attached to the winch 164 and a second end attached to the transport platform 148. In the retracted position, the cable 168 is substantially wound onto the winch 164. To move the device 144 from the retracted position to the extended position, the winch 164 is switched from a locked position, in which the cable 168 can not be unwound from the drum 165, to an unlocked position, in which the cable 168 can be unwound from the drum 165. Due to the angled arrangement of the device 144, the extension members 64 and the transport platform 148 begin to extend along the support members 60 and carriage 36, respectively, when the winch 164 is switched to the unlocked position. The drive assembly 152 controls the rate at which the extension members 64 and transport platform 148 extend. As the extension members 64 approaches full extension and the transport platform 148 extends along the carriage 36, the carriage 36 begins to rotate about the pivots 80. The rollers 156 on the transport platform 148 contact the ground as the carriage 36 rotates, and allow the transport platform 148 to continue extending along the carriage 36. The transport platform 148 extends either until the platform 148 reaches full extension along the carriage 36 or until the platform 148 is generally parallel with the ground.

The device 144 is moved from the extended position to the retracted position by switching the winch 164 to a wind position, wherein the cable 168 is wound onto the drum 165. The winch 164 fully retracts the transport platform 148 along the carriage 36 and rotates the carriage 36 toward being generally parallel with the base and second frames 28 and 32. The extension members 64 are then retracted along the support members 60 by the winch 164, until the device 144 is in the retracted position.

Figure 4:
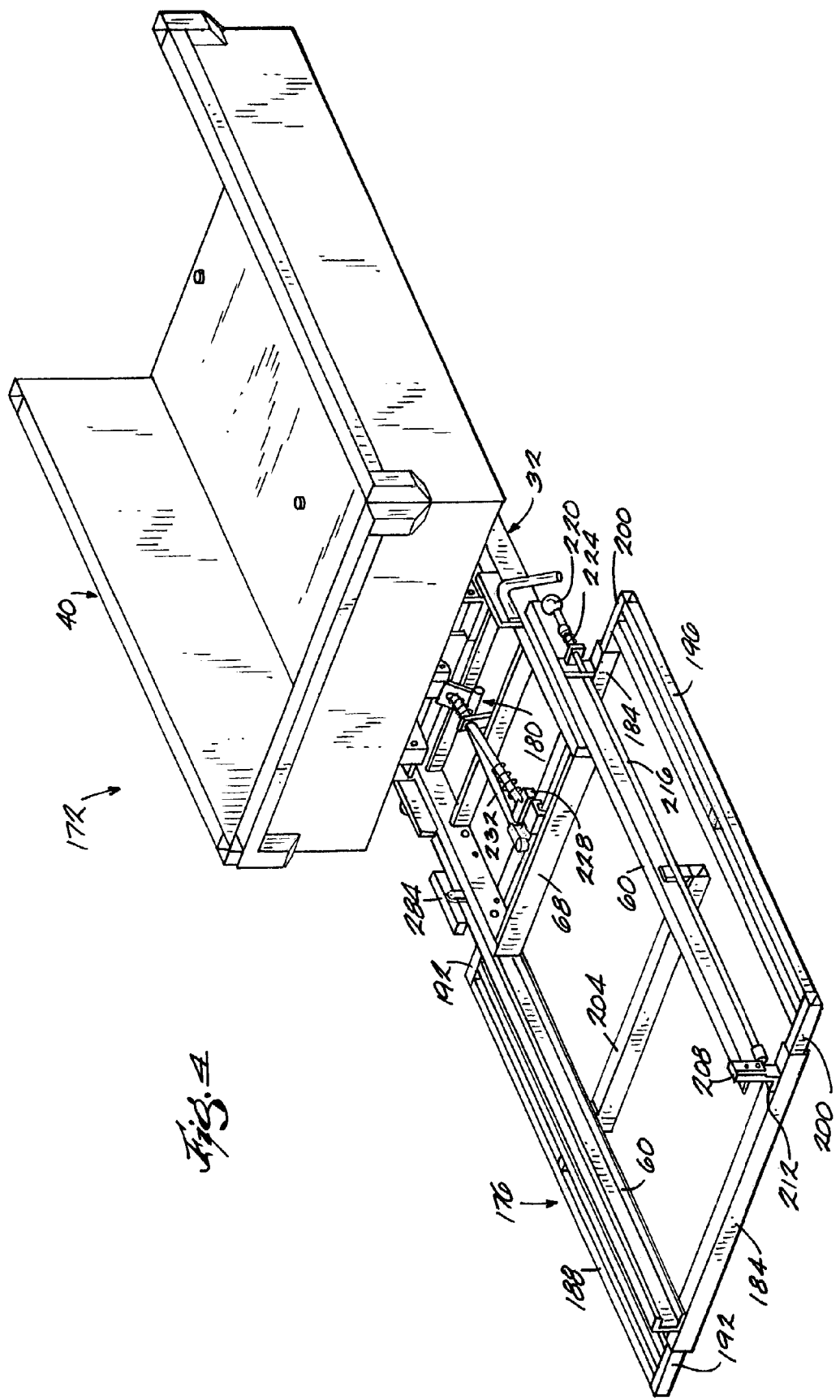
FIG. 4 is a perspective view of a third embodiment of the invention.
Figure 5:
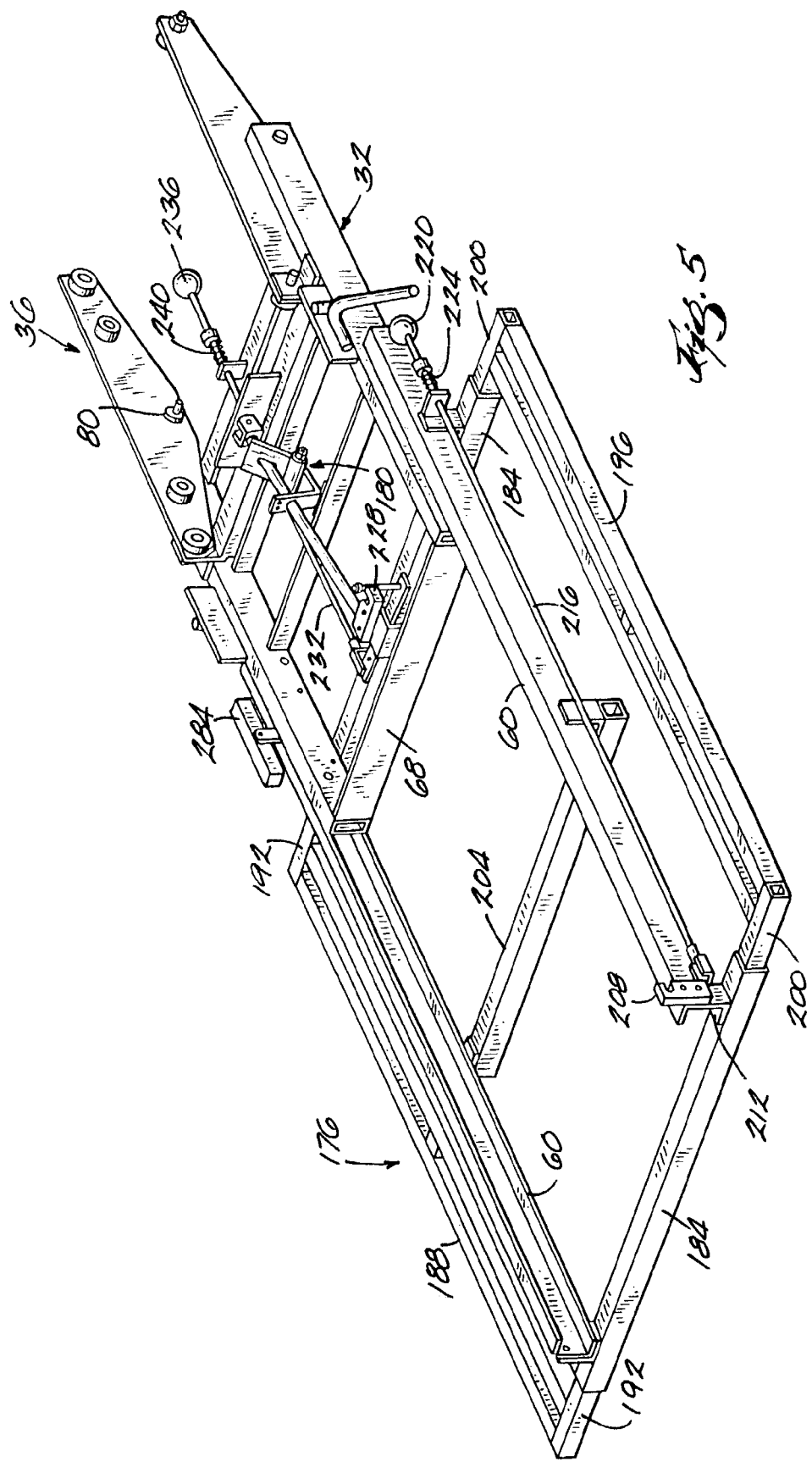
FIG. 5 is a perspective view of the device of FIG. 4 with a transport support removed.

Referring to FIGS. 4 and 5, another embodiment of the invention, a transporting accessory or transporting device 172, is illustrated. Again, like components are given like reference numbers. The device 172 is manipulated manually, but could be manipulated by a drive assembly (as described above), a motor, or any other power source. The device 172 is, in one embodiment, designed to be mounted within the cargo area of an SUV, stationwagon, or similar vehicle.

The device 172 includes an adjustable base frame 176 that can adjust in width to accommodate vehicles of varying widths, and an actuating mechanism 180 that controls a rate at which the dump bed 40 rotates about the pivots 80. The base frame 176 includes a pair of spaced apart rectangular tube members 184, a first support member 188 having a pair of projecting arms 192 slidably received by a respective end of the tube members 184, and a second support member 196 having a pair of projecting arms 200 slidably received by the respective other ends of tube members 184. The support members 188 and 196 are telescopically adjustable with respect to the tube members 184 to increase or decrease the width of the base frame 176. The support members 188 and 196 can be secured to the tube members 184 by any suitable fastening means known to those skilled in the art.

The longitudinal support members 60 are mounted to the tube members 184. A cross brace 204 extends between the support members 60 for additional strength and stability. A lock latch release device or latch mechanism 208 for releasably holding the second frame 32 is secured to a rear end 212 of the support member 60. A rod 216 mounted to and extending along the support member 60 is operatively connected to the latch mechanism 208. A handle or knob 220 and spring device 224 are attached to rod 216 to release the latch mechanism 208 to allow the second frame 32 to move along the base frame 176.

A latch mechanism 228 for releasably holding the dump bed 40 to the carriage 36 is mounted to one of the lateral support members 68 of the second frame 32. A rod 232 having a handle 236 and spring device 240 is operatively connectable to the latch mechanism 228 to allow the dump bed 40 to move along the carriage 36. The carriage 36 is pivotally mounted to the second frame 32 at the pivots 80, so that when the dump bed 40 is allowed to dump, the carriage 36 pivots about the pivots 80.

Figure 6:
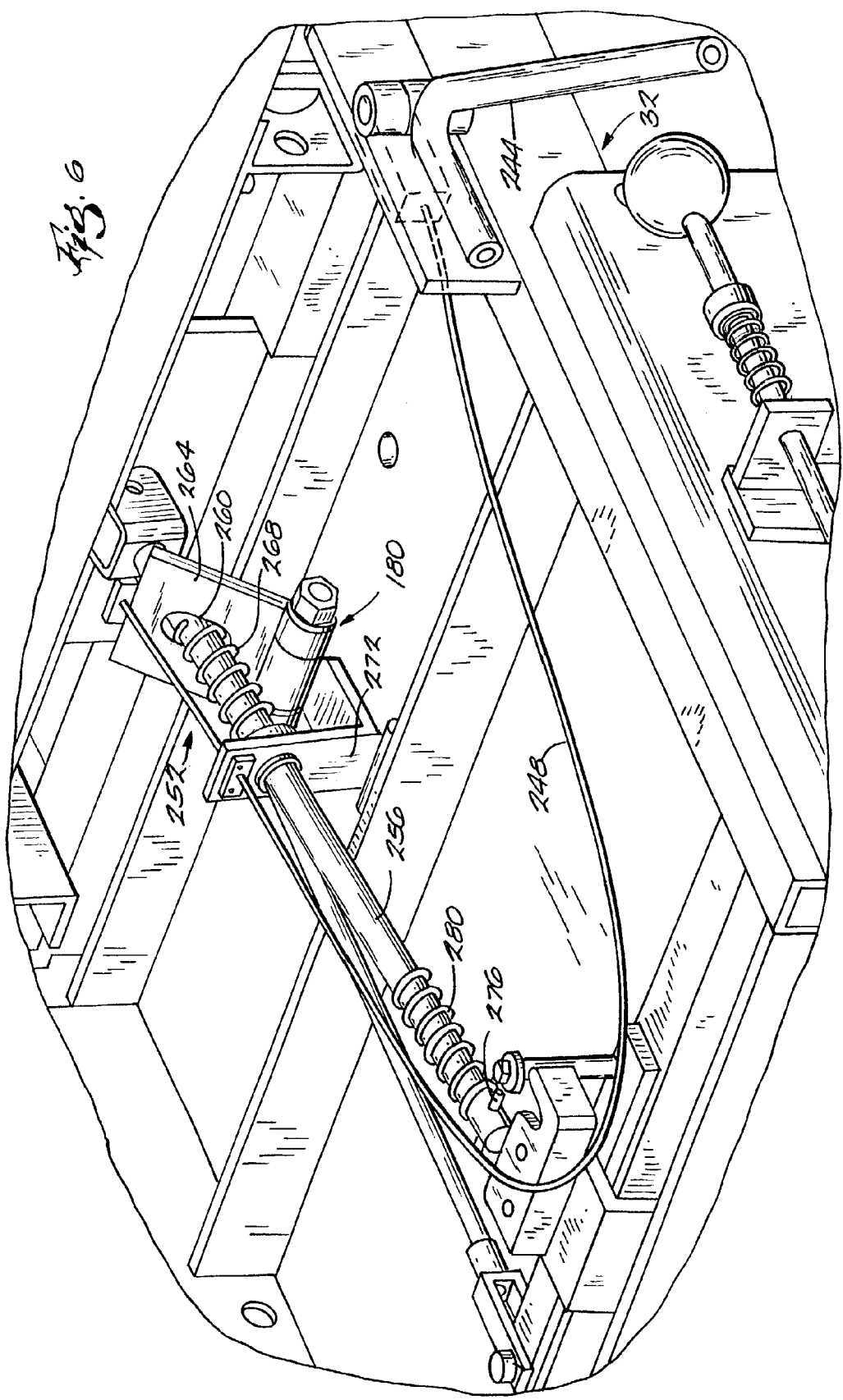
FIG. 6 is an enlarged, partial perspective view of a portion of the device of FIG. 4.
Figure 7:
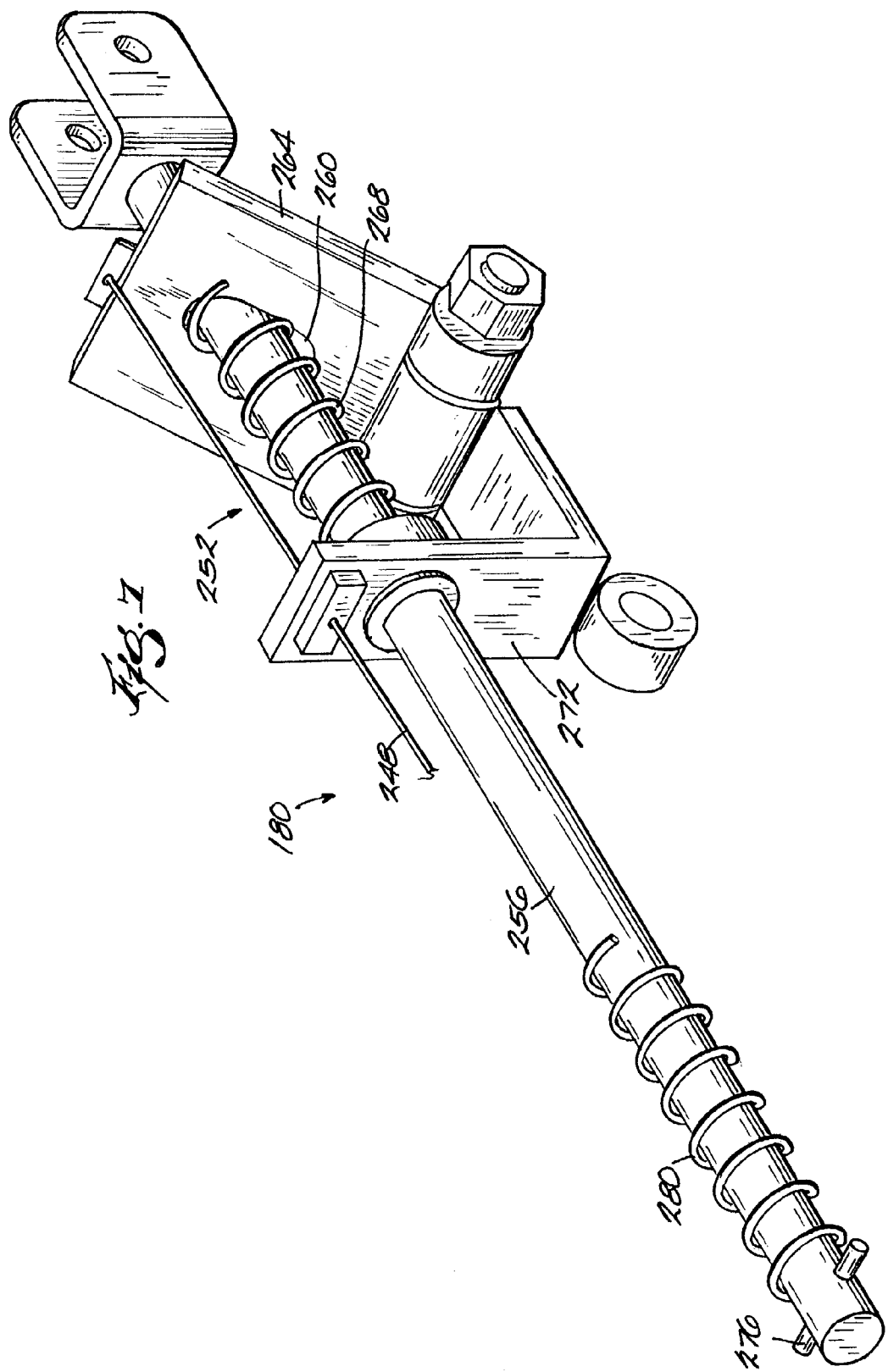
FIG. 7 is an enlarged, partial perspective view of a braking mechanism of the device of FIG. 4.

The actuating mechanism 180 is illustrated in more detail in FIGS. 6 and 7. As shown, the actuating mechanism 180 includes a handle or lever 244 mounted to the second frame 32, a cable 248 attached at one end to the lever 244 and at the other end to a hinge assembly 252, and a shaft 256 which extends through the hinge assembly 252.

Referring now to FIGS. 4–7, after the device 172 has been mounted to the vehicle 24, the second frame 32 is held by the latch mechanism 208 and the dump bed 40 is held by the latch mechanism 228. To utilize the device 172, the spring rod 216 is pushed in to release the lock latch mechanism 208. The extension members 64 and dump bed 40 are then free to extend along the support members 60 of the base frame 176 and the carriage 36, respectively. Manually pulling the dump bed 40 causes the guide rollers 72 of the second frame 32 to ride along support members 60 of the base frame 176. Stops (not shown) or the like are mounted to the base frame 176 to stop the forward movement of the extension members 64 when the extension members 64 have been fully extended.

To fully extend the dump bed 40, the spring rod 232 is pushed in to release the lock latch mechanism 228. Stops or similar devices are mounted to the dump bed 40 or the support members 68 of the second frame 32 to stop the forward movement of the dump bed 40 when the dump bed 40 has been fully extended. In this position, the actuating mechanism 180 holds the dump bed 40 generally parallel with the base and second frames 176 and 32. The shaft 256 of the actuating mechanism 180 is frictionally held within an aperture 260 of a hinge plate 264 of the hinge assembly 252 by a biasing spring 268. The spring 268 pushes hinge plate 264 away from a second hinge plate 272 of the hinge assembly 252. Force applied to the lever 244 causes the cable 248 to pinch or pull the hinge plates 264 and 272 together, thereby releasing the frictional engagement between the shaft 256 and the hinge plate 264. Thereafter, because the center of gravity of the dump bed 40 is beyond the pivots 80, the dump bed 40 tilts to dump the load held within the dump bed 40. As the dump bed 40 tilts, the shaft 256 is pulled through the hinge assembly 252. A stop pin 276 secured to one end of the shaft 256 prevents the shaft 256 from being pulled completely through the hinge assembly 252. A spring 280, which is positioned around shaft 256 and behind plate 272, controls the dumping motion of the dump bed 40 to prevent sudden, rapid dumping. As should be apparent, extremely rapid dumping could damage the device 172 or the vehicle 24.

As the dump bed 40 dumps, a reverse brake 284 pivotally mounted to the second frame 32 is pivoted into engagement with the base frame 176 to prevent rearward movement of the second frame 32. Rearward movement of the second frame 32 could cause injury to an individual operating the device 172.

Once the dumping action is completed, the dump bed 40 may be manually pivoted upwards until it is again generally parallel with the base and second frames 176 and 32. The movement of the dump bed 40 pushes the shaft 256 back through the hinge assembly 252. The biasing spring 268 causes the hinge plate 264 to again frictionally hold the shaft 256. Once the hinge plate 264 engages the shaft 256, the dump bed 40 is held in position. The movement of the dump bed 40 to the non-dumping position also pivots the reverse brake 284 out of engagement with the base frame 176 freeing the second frame 32 to move backwards with respect to the base frame 176. Once the dump bed 40 is generally parallel to the base and second frames 176 and 32, the dump bed 40 may be pushed backwards until the lock latch mechanism 228 is engaged to hold the dump bed 40. Lastly, the second frame 32 may be pushed backwards until the lock latch mechanism 208 is engaged to hold the second frame 32. Once the second frame 32 engages the lock latch mechanism 208, the device 172 is properly positioned for transportation or loading purposes.

Figure 8:
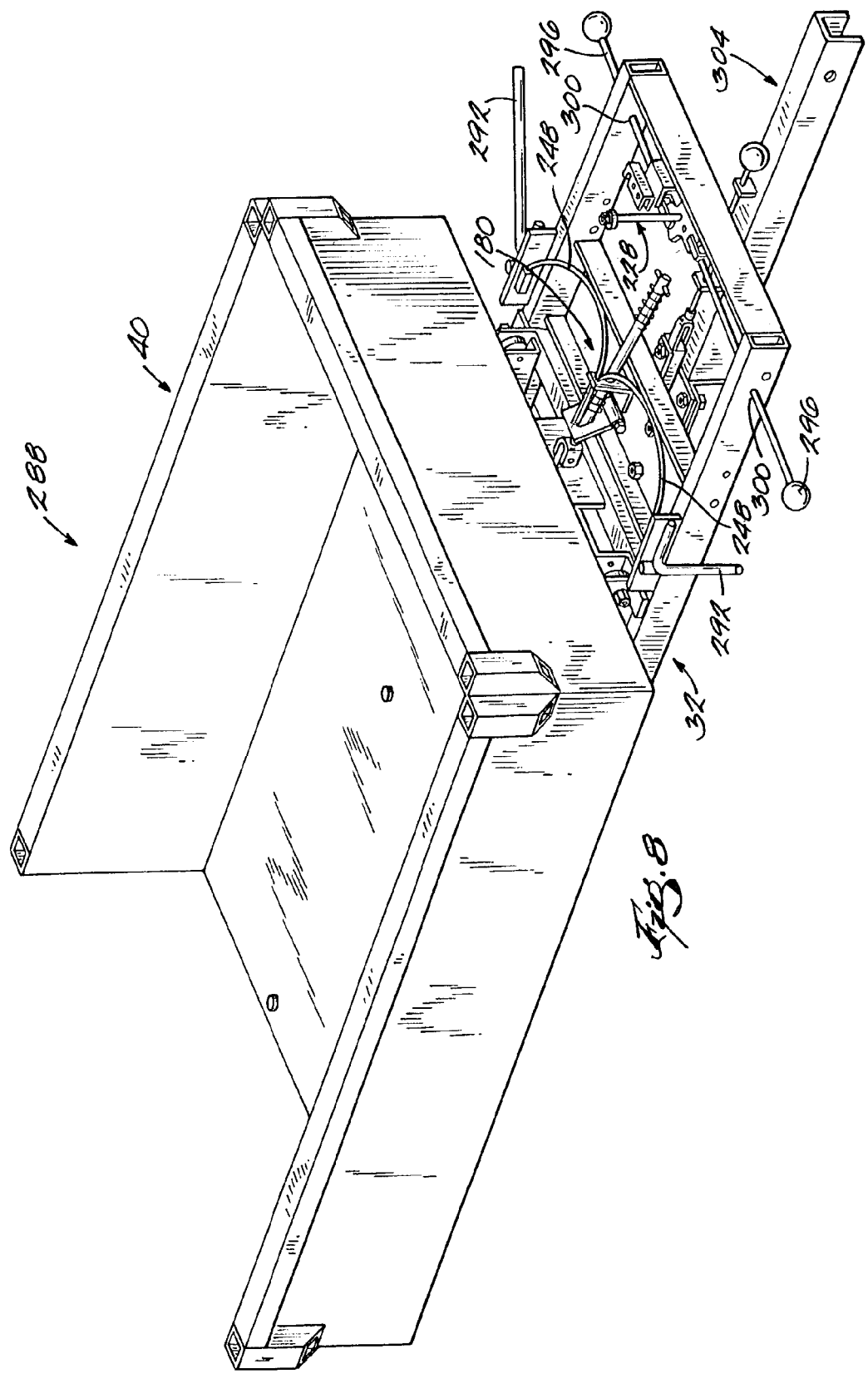
FIG. 8 is a perspective view of a forth embodiment of the invention.

Yet another embodiment of the invention, a transporting device 288, is illustrated in FIG. 8. The device 288 is adapted to be mounted to a trailer hitch (not shown) of the vehicle 24. The second frame 32, dump bed 40, and the actuating mechanism 180 of the device 288 are similar to the components of the devices in previous embodiments. However, two lever handles 292 are provided so that the dump bed 40 can be dumped from either side of the device 288. Two spring rods 296 extending through holes 300 are provided to operate latch mechanism 228 from either side of the dump bed 40. A hitch member 304 is coupled to the second frame 32.

Figure 9:
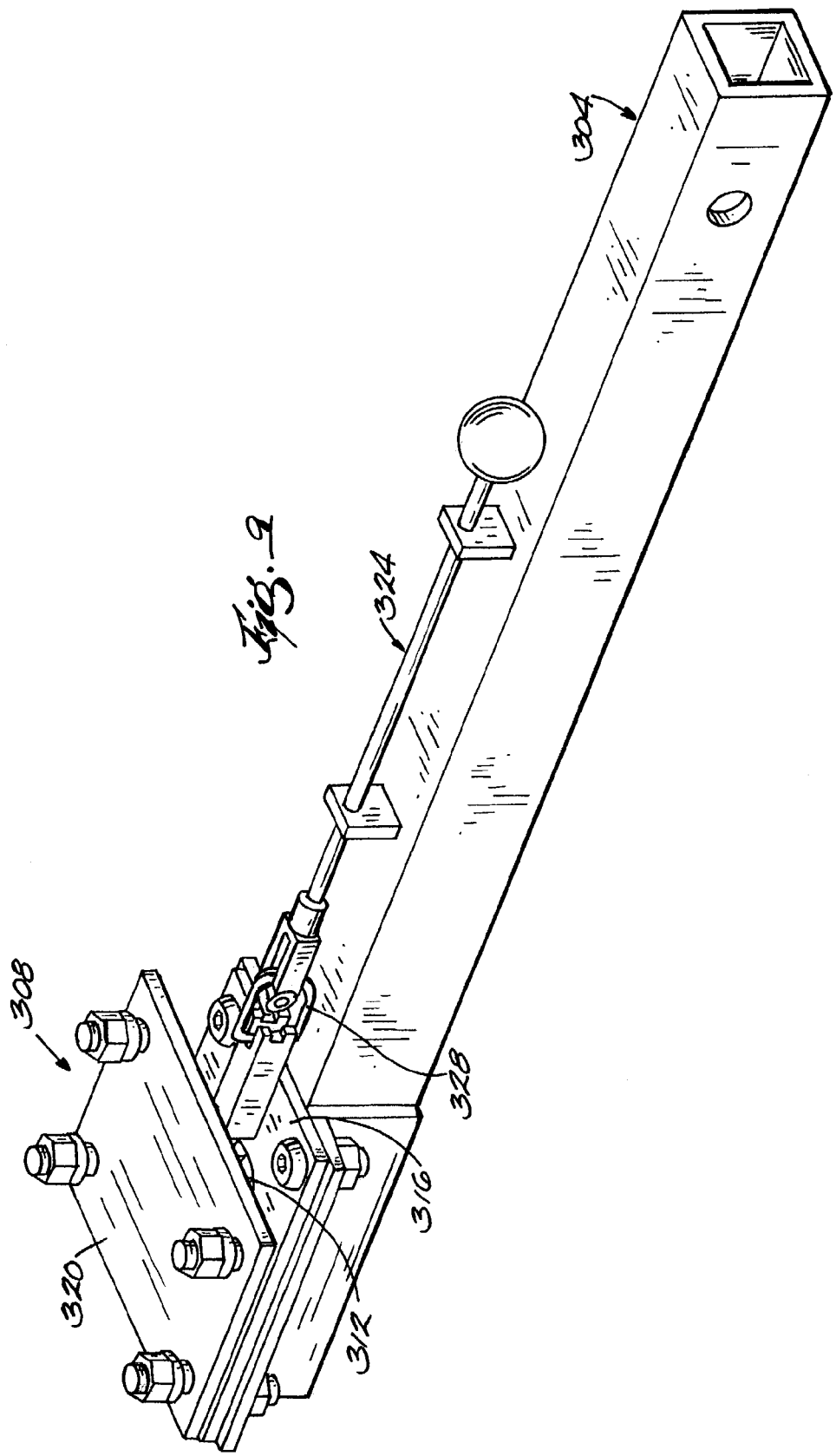
FIG. 9 is an enlarged perspective view of a portion of the transporting device of FIG. 8.

As best seen by reference to FIG. 9, the second frame 32 is swivelly mounted to the hitch member 304 by a turntable or swivel assembly 308. The swivel assembly 308 includes a swiveling mechanism 312 positioned between a plate 316 fixed to the hitch member 304 and a second plate 320 mounted to the second frame 32. The swivel assembly 308 also includes a rod and handle assembly 324 and spring pin 328. The spring pin 328 contacts the swiveling mechanism 312 and is moved in and out of contact with the swiveling mechanism 312 by pulling and releasing, respectively, the rod and handle assembly 324. The rod and handle assembly 324 and spring pin 328 are operable in conjunction with the swiveling mechanism 312 to selectively lock the swivel assembly 308 in one of a plurality of swiveled positions.

In use, the device 288 is first mounted to the trailer hitch of the vehicle 24. The latch mechanism 228 holds the dump bed 40. If it is desirable to locate the dump bed 40 off to one of the sides of the vehicle 24, the handle of the rod and handle assembly 324 is pulled outward thereby releasing the spring pin 328 from the swiveling mechanism 312 to allow the second frame 32, and therefore the dump bed 40, to be swiveled or turned to a desired position, preferably 90 degrees from its original position. The rod and handle assembly 324 is released and the spring pin 328 mates with the swiveling mechanism 312 to secure the dump bed 40 in the desired position. The spring rod 232 is moved to release the lock latch mechanism 228. When the spring rod 232 is so positioned, the dump bed 40 may be moved outward with respect to the second frame 32. Once the dump bed 40 is properly extended outward, one of the levers 292 (depending on which side of the dump bed 40 the operator is standing) is activated to release the actuating mechanism 180 to allow the dump bed 40 to dump. Once the dumping action is complete, the dump bed 40 is put back into its non-dumping position in much the same fashion as the embodiments discussed above.

Referring to FIGS. 10–19, another embodiment of the invention, a transporting accessory or transporting device 332, is illustrated. Many of the components in the alternate embodiment are similar to the components in previous embodiments. Therefore, like components will be given like reference numbers.

Figure 10:
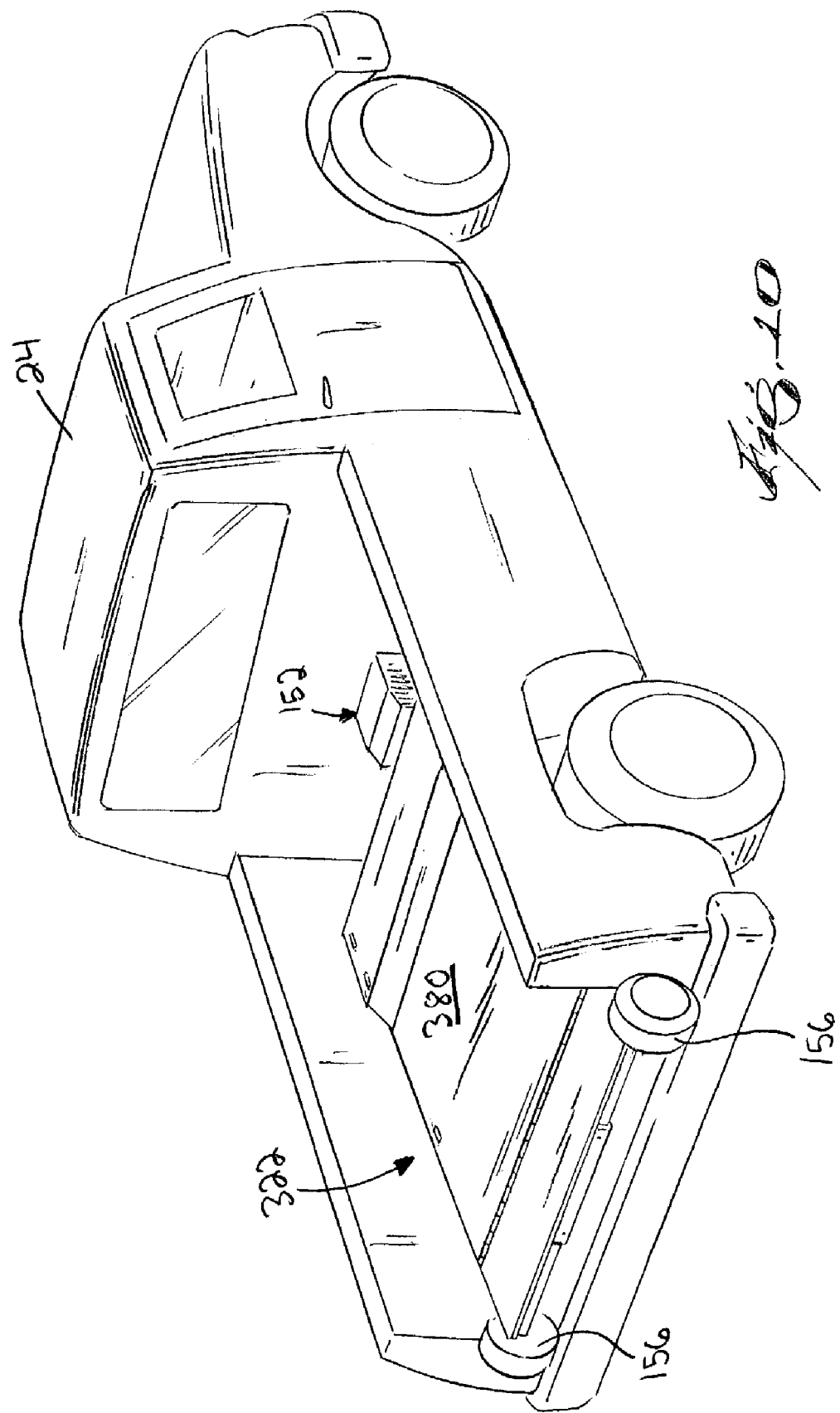
FIG. 10 is a right perspective view of a fifth embodiment of a dumping and transporting accessory device of the invention, the device is connected to a vehicle and is shown in a retracted position.
Figure 11:
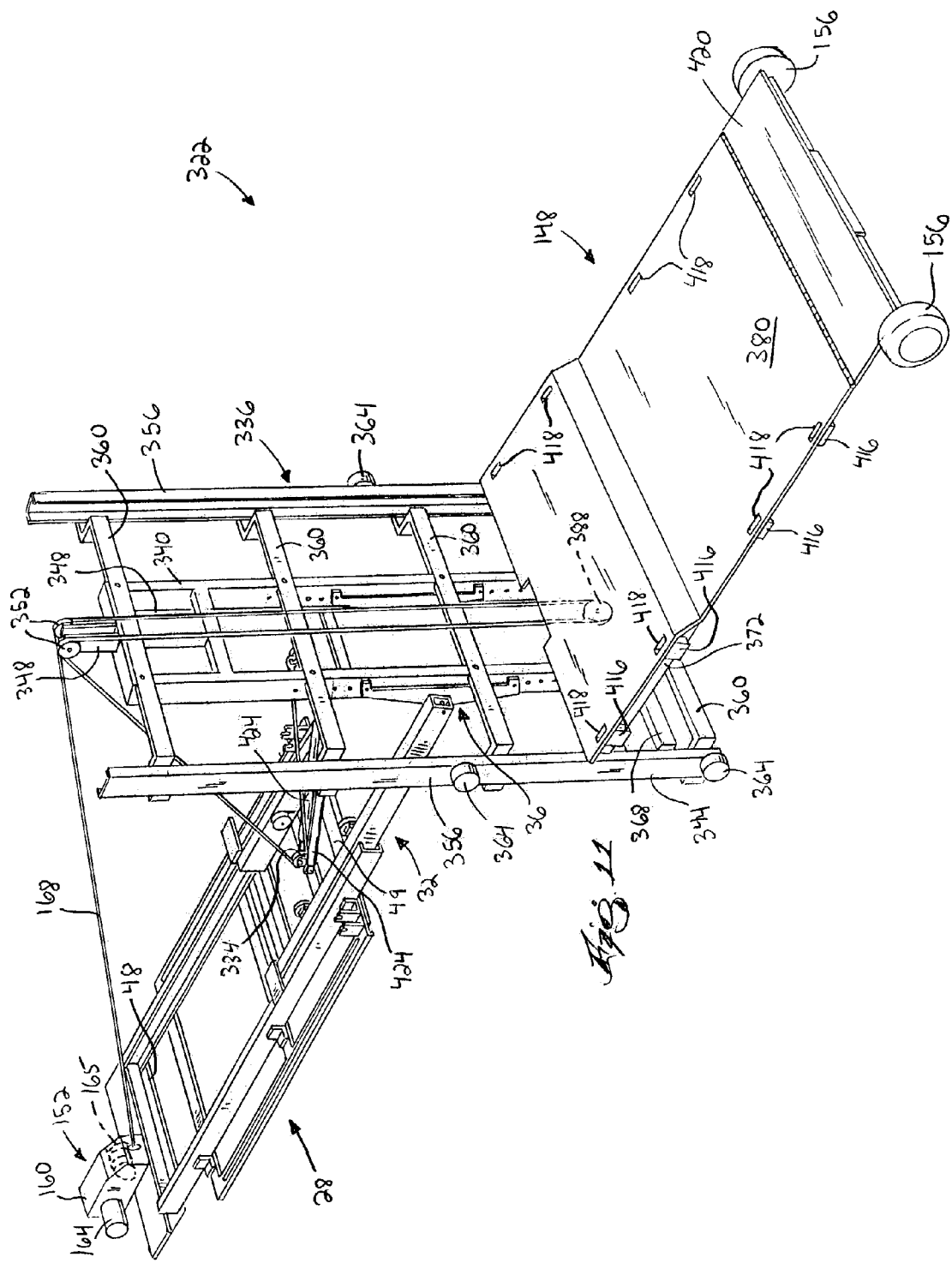
FIG. 11 is a left perspective view of the device of FIG. 10, shown in an extended position.
Figure 12:
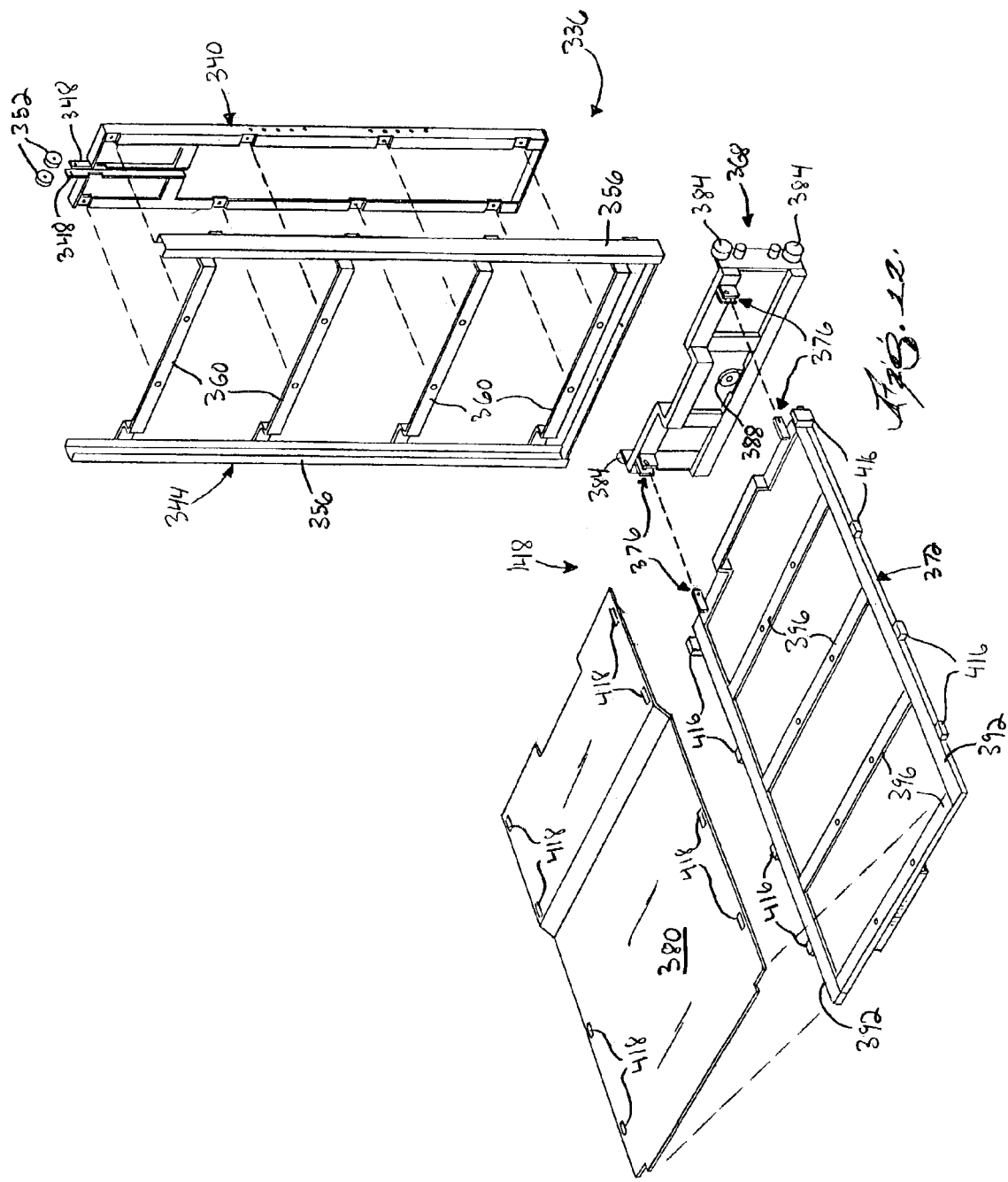
FIG. 12 is an exploded view of a portion of the device of FIG. 10.

Referring now to FIGS. 10–12, the transport device 332 is mountable in a bed or cargo area of a vehicle 24, such as, for example a truck, a stationwagon, and the like, and includes a base frame 28, a second frame 32, a trolley or carriage 36, a pivotal support frame 336, a transport platform 148 (generically, a type of transport support), and a drive assembly 152 that controls movement of the device 332 between a retracted position (shown in FIG. 10) and an extended position (shown in FIG. 11). In the extended position, cargo can be loaded on and unloaded from the transport platform 148. In the retracted position, the transport device 332 is in a proper position to be safely transported.

In one embodiment, the transport device 332 is arranged at an angle within the vehicle 24 so that the end beam 48 of the base frame 28 is elevated with respect to the end beam 49. The angled arrangement may be achieved by mounting a shim or block 338 under the end beam 48 such that there is an angle of incline about 3 to 5° from the front to the rear of the device 332. It should be understood that the device 322 can be inclined at other angles with respect to the vehicle 24 and still be within the spirit and scope of the present invention. Arrangement of the device 332 in such a manner, biases the device 332 and cargo thereon (via gravity) toward the extended position.

With continued reference to FIGS. 10–12, the second frame 32 includes a pulley 334 rotatably connected thereto for engaging the cable 168 of the drive assembly 152 (discussed in greater detail below). The pivotal support frame 336 includes a carriage frame 340 rigidly connected to the carriage 36 via fasteners and a guide frame 344 connected to the carriage frame 340. The carriage frame 340 can also be connected to the carriage 36 without fasteners, such as, for example, by welding, integrally forming, and the like. The pivotal support frame 336 is rotatable with the carriage 36 between a substantially horizontal position, in which the carriage 36 and pivotal support frame 336 are substantially parallel to the second frame 32, and an inclined position, in which the carriage 36 and pivotal support frame 336 are inclined relative to the second frame 32. As mentioned above, the device 332 and, therefore, the pivotal support frame 336 and carriage 36 are inclined with respect to the vehicle 24 from the front to the rear of the device 332. Accordingly, the substantially horizontal position of the pivotal support frame 336 and carriage 36 can be any position that is between parallel with the vehicle 24 and being at the angle of inclination between the device 332 and the vehicle 24. In addition, the substantially horizontal position of the pivotal support frame 336 and the carriage 36 may be greater or less than the angle of inclination between the device 322 and the vehicle. 24. The substantially horizontal position and inclined position of the carriage 36 and pivotal support frame 336 correspond to the retracted position and extended position of the device 332, respectively. Pulley support brackets 348 are mounted to the carriage frame 340 to support a pair of pulleys 352 in a rotatable manner. The pulleys 352 are independently rotatable with respect to one another and are engaged by the cable 168 of the drive assembly 152 (discussed in greater detail below).

The guide frame 344 includes C-shaped upright members 356 and a plurality of cross brackets 360 mounted therebetween to provide structural rigidity and strength to the guide frame 344. Each of the cross brackets 360 is mounted to the carriage frame 340. A pair of guide rollers 364 is rotatably connected to an outer surface of each upright member 356 and is operable to engage and slidably guide the transport platform 148 along the pivotal support frame 336.

With particular reference to FIG. 12, the transport platform 148 includes a transport trolley 368, a transport frame 372 pivotally connected to the transport trolley 368 via pivotal connections 376, and a cargo platform 380 connected to the transport frame 372 for supporting cargo thereon. The transport trolley 368 includes rotatable guide rollers 384 on each side thereof that are respectively positioned within the C-shaped upright members 356 of the guide frame 344 to facilitate rolling of the transport trolley 368 along the pivotal support frame 336. The transport trolley 368 also includes a rotatable pulley 388 engaged by the cable 168 of the drive assembly 152 (discussed in greater detail below). The transport frame 372 includes a pair of C-shaped support members 392 opening substantially downward and a plurality of cross brackets 396 connected between the support members 392 to provide rigidity and strength to the transport platform 148. The cargo platform 380 is connected to the plurality of cross brackets 396. The transport platform 148 also includes a pair of rollers or wheels 156 engageable with an underlying surface to facilitate movement of the transport platform 148 over the underlying surface (discussed in greater detail below) without a significant amount of friction. The wheels 156 are selectively connectable to the transport platform 148 and can be disconnected when not needed, such as, for example when the device 332 is in the retracted position or the device 332 is being transported by the vehicle 24. Alternatively, skids, skis or the like can be used to facilitate movement of the transport platform 148 over the underlying surface.

Referring to FIGS. 13 and 14, the transport platform 148 also includes side walls 400, a front wall 404, and a rear wall (not shown) that are selectively connectable to the transport frame 372. Each of the walls include connecting projections 412 that are selectively insertable into wall connectors 416 disposed along the support members 392 of the transport frame 372 to selectively connect the walls to the transport frame 372. Apertures 418 are defined through the cargo platform 380 to allow the projections 412 to pass therethrough and into the wall connectors 416. It should be understood that the walls can be connected to the transport frame 372 in other manners, such as, for example fastening, welding, integrally forming, and the like, and still be within the spirit and scope of the present invention. It should also be understood that the walls can alternatively be mounted to the cargo platform 380.

Figure 15:
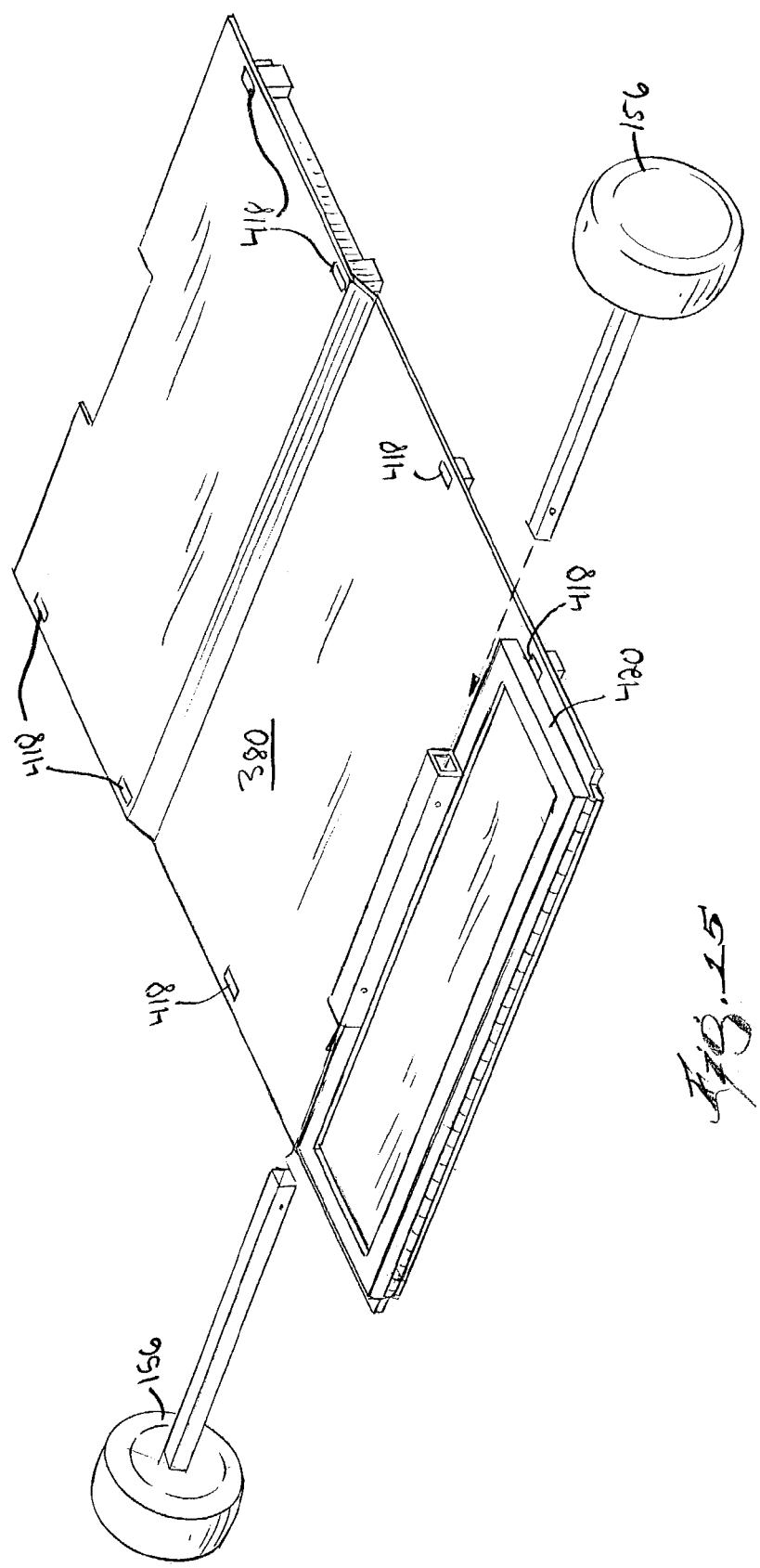
FIG. 15 is a right perspective view of a portion of the transport platform of FIG. 13, shown with a rear portion of the transport platform folded to a storing position.

Referring to FIG. 15, the cargo platform 380 includes a rotatable rear portion 420 rotatable between an operative position, in which the rear portion 420 is substantially co-planar with the remainder of the cargo platform 380 to maximize the overall length of the cargo platform 380, and a storing position, in which the rear portion 420 is rotated toward the top surface of the cargo platform 380 and is positioned above the remainder of the cargo platform 380 to shorten the overall length of the cargo platform 380. It may be desirable to rotate the rear portion 420 to the storing position when storing the device 332 during non-operation or to decrease or eliminate the amount of cargo platform 380 that extends out of the vehicle 24. The wheels 156 may remain connected to the transport platform 148 or may be removed from the transport platform 148 when the rear portion 420 is in the storing position. The rear portion 420 may also be rotated to an intermediate position (not shown), in which the rear portion 420 is rotated to a substantially perpendicular orientation relative to the top surface of the cargo platform 380. In the intermediate position, the rear portion 420 may be connected to the side walls 400 to take the place of the rear wall.

Having focused on the structural components of the device 322, its operation will now be described in greater detail with respect to the movement thereof between the extended position and the retracted position.

Figure 16:
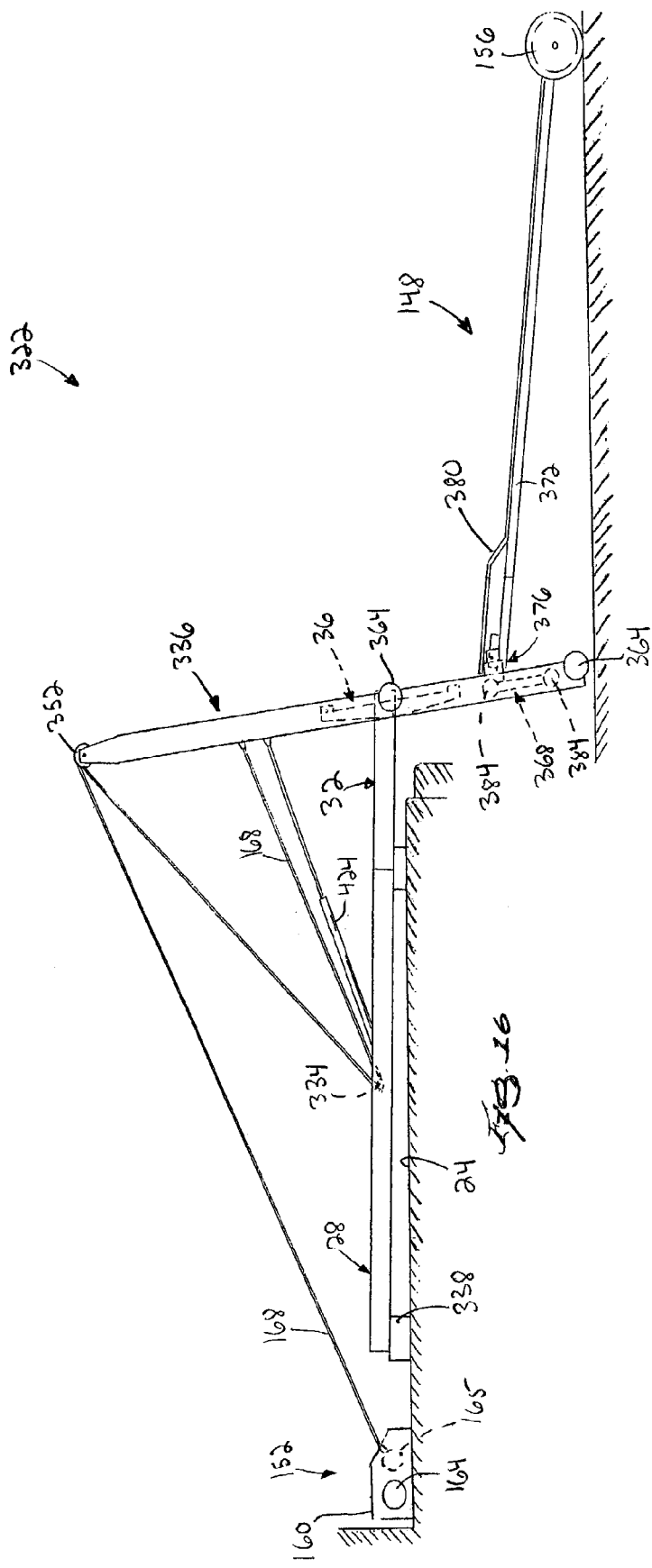
FIG. 16 is a left elevation schematic of the device of FIG. 10, shown in the extended position.

Referring to FIGS. 11 and 16, the device 332 is illustrated in the extended position. To move the device 332 from the extended position to the retracted position, the drive assembly 152 is activated to rotate the drum 165 in a direction to wind the cable 168 therearound. The cable 168 has one end connected to the drum 165 and is partially wound around the drum 165. The portion of the cable 168 that is not wound around the drum 165 extends away from the drum 165, over one of the pulleys 352 connected to the carriage frame 340, down to and partially around the pulley 388 connected to the transport trolley, up to and over the other of the pulleys 352 connected to the carriage frame 340, down and partially around the pulley 334 connected to the second frame 32 and has the other end of the cable 168 connected to the pivotal support frame 336. Alternatively, the second end of the cable 168 can be connected to the second frame 32. In such a circumstance, the second frame 32 does not require the pulley 334. Upon activation of the drive assembly 152, the cable 168 is wound further around the drum 165, which exerts a force on the pivotal support frame 336 and causes the pivotal support frame 336 and carriage 36 to rotate in a counter-clockwise direction (as viewed in FIG. 16) from their inclined positions (as shown in FIG. 16) toward their substantially horizontal positions (as shown in FIG. 19). Activation of the drive assembly 152 also exerts a force on the transport trolley 368 to move the transport trolley 368 from its extended position (as shown in FIG. 16) to its retracted position (as shown in FIG. 19).

Figure 17:
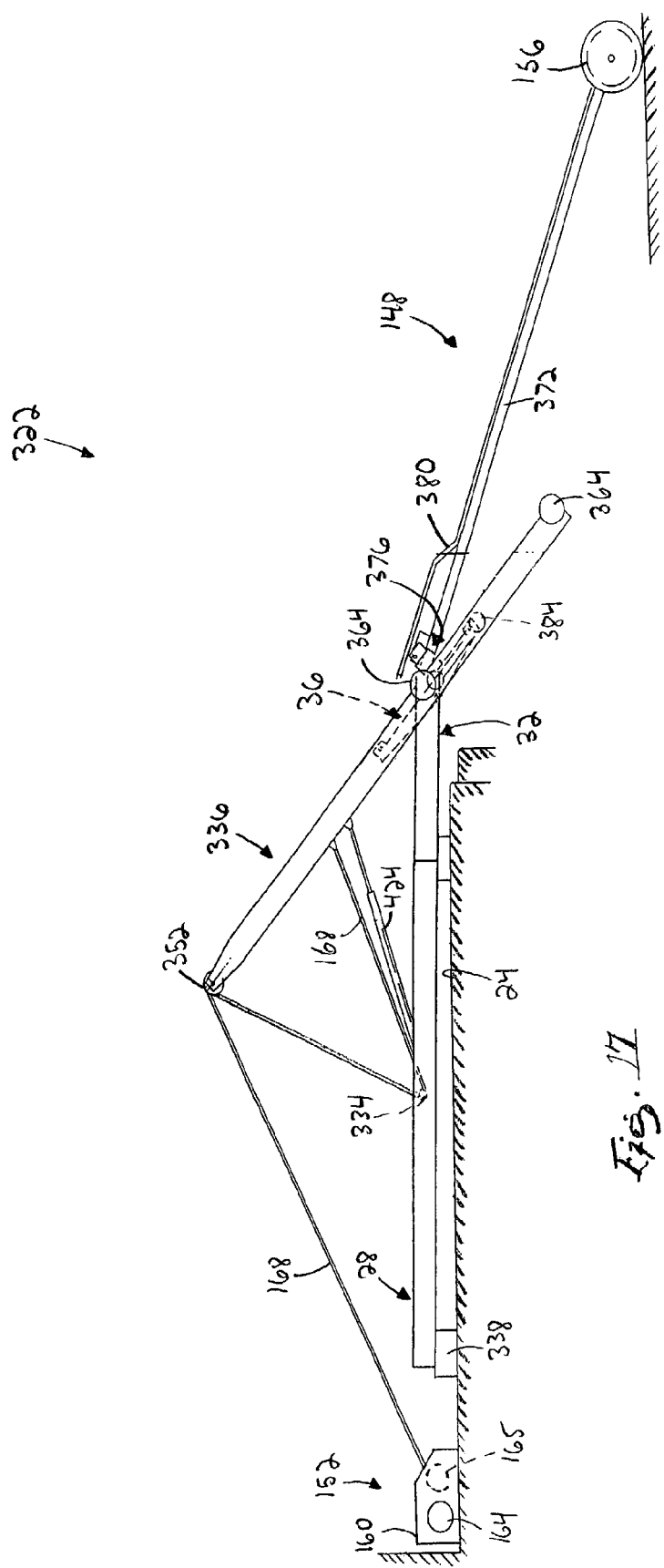
FIG. 17 is a left elevation schematic of the device of FIG. 10, shown in a first position between the extended and retracted positions.

Referring to FIG. 17, the device 332 is illustrated with the pivotal support frame 336 and the carriage 36 partially rotated toward their substantially horizontal positions and the transport platform 148 partially moved to its retracted position. As the transport platform 148 moves toward its retracted position, the guide rollers 384 of the trolley 368 roll within and along the upright members 356 of the guide frame 344 and the transport frame 372 and cargo platform 380 pivot relative to the trolley 368 about the pivotal connections 376. The wheels 156 engage the underlying surface and roll therealong as the transport platform 148 moves toward its retracted position.

Figure 18:
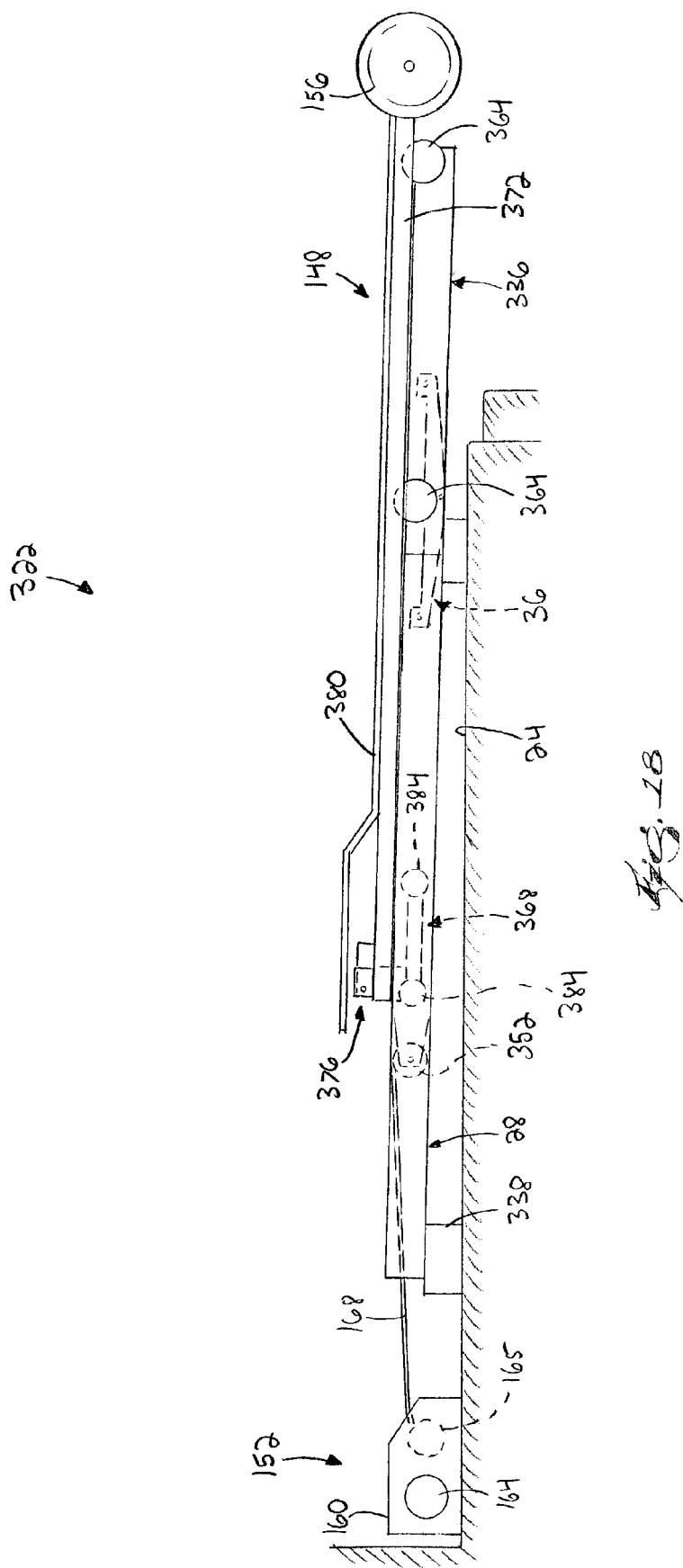
FIG. 18 is a left elevation schematic of the device of FIG. 10, shown in a second position between the extended and retracted positions.

Referring to FIG. 18, the pivotal support frame 336 and carriage 36 are rotated to their substantially horizontal positions and the transport platform 148 is in its retracted position. However, a portion of the second frame 32, the pivotal support frame 336, the carriage 36, and the transport platform 148 extend substantially beyond the bed of the vehicle 24 and need to be substantially moved into the bed of the vehicle 24 for the device 332 to be in the retracted position.

Referring to FIG. 19, the device 332 is illustrated in the retracted position. Accordingly, the second frame 32 is in its retracted position, the carriage 36 and pivotal support frame 336 are positioned in their substantially horizontal positions, and the transport platform 148 is positioned in its retracted position. In the retracted position, the device 332 does not extend substantially beyond the bed of the vehicle 24 and the device 332 is ready for transport. It should be understood that the device 332 can either extend slightly (not substantially) out of the vehicle 24 as illustrated in FIG. 10 or can be positioned completely within the vehicle 24 and have no portion thereof extending out of the vehicle 24.

To move the device 332 from the retracted position to the extended position, the drive assembly 152 is activated to unwind the cable 168 from the drum 165 and control the rate at which the device 322 moves to the extended position. The components of the device 332 move along substantially similar paths when moving toward the extended position as they do when moving toward the retracted position. As the cable 168 unwinds from the drum 165, the angled arrangement of the device 332 facilitates movement of the device 332 from the retracted position to the extended position under the force of gravity. In the illustrated embodiment, the device 332 includes a pair of actuating mechanisms or dampers 424 connected between the second frame 32 and the pivotal support frame 336 to assist the drive assembly 152 in controlling the rate at which the device 322 moves to the extended position. More particularly, the dampers 424 control the rate, in combination with the drive assembly 152, at which the carriage 36 and pivotal support frame 336 rotate toward the inclined position.

It should be understood that the device 332 can include any number of dampers 424 to control the rate of rotation, including zero, and still be within the spirit and scope of the present invention. In embodiments that include zero dampers 424, the rate at which the device 322 moves toward the extended position is controlled entirely by the drive assembly 152.

It should also be understood that the rate at which the device 332 moves toward the extended position can be entirely controlled by the dampers 424.

It should further be understood that the features, components, and alternatives of the transport accessories described in the various embodiments above, can be utilized in any of the other embodiments of the transport accessories described above in which the particular features, components, and alternatives were not explicitly described. For example, the adjustable base frame 176 can be utilized in any of the transport accessories described above.

Alternate embodiments of the transporting devices can be derived from the embodiments described above and still be covered under the present invention. Other alternative embodiments will be apparent to those skilled in the art and are within the intended scope of the present invention. Thus, the present invention is to be limited only by the following claims.

The invention claimed is:

1. A transport accessory useable with a vehicle for supporting cargo, the transport accessory comprising:
 a base frame connectable to the vehicle;
 a second frame slidably connected to the base frame and movable between a retracted position and an extended position relative to the base frame to extend a distal end out and away from the confines of the vehicle;
 a carriage pivotally connected to the distal end of the second frame and pivotable between a substantially horizontal position and an inclined first operative position relative to the underlying surface;
 a support frame having a central portion, the central portion rigidly connected to the carriage and pivotal therewith between the substantially horizontal position and the inclined position; and
 a transport platform slidably and pivotably connected to the support frame and slidable between a retracted position and an extended position relative to the support frame, the transport platform being substantially horizontal when in the retracted and extended position, the transport platform operable to support cargo thereon and the cargo being loadable on and unloadable from the transport platform when the transport platform is in the extended position.

2. The transport accessory of claim 1, wherein the carriage extends above and below the pivot point and has a second operative position which is a substantially vertical position.

3. The transport accessory of claim 1, wherein the carriage has a second operative position which is a substantially perpendicular position relative to the second frame.

4. The transport accessory of claim 1, wherein the support frame includes at least one roller rotatably connected thereto, the transport platform engaging the at least one roller when the transport platform is in the retracted position and not engaging the roller when the transport platform is in the extended position.

5. The transport accessory of claim 1, wherein the support frame includes a pair of rollers rotatably connected to each of a first side and a second side of the support frame, the first and second sides being opposite sides of the support frame, each pair of rollers engaging a bottom surface of the transport platform when the transport platform is in the retracted position and neither pair of the rollers engaging the transport platform when in the extended position.

6. The transport accessory of claim 1, wherein the transport platform is slidably and pivotably connected to the support frame and including at least one roller engageable with the support frame to facilitate rolling engagement of the transport platform with the support frame and facilitate movement of the transport platform between the retracted and extended positions thereof.

7. The transport accessory of claim 6, wherein the support frame includes a pair of support members spaced apart from one another and the transport platform includes having at least one roller positioned on each of opposite sides of the transport platform, each roller being positioned within a respective one of the support members and rollable therein to facilitate rolling engagement of the transport platform with the support frame and facilitate movement of the transport platform between the retracted and extended positions.

8. The transport accessory of claim 6, wherein the transport platform also includes a transport frame and a cargo platform connected to the transport frame, the cargo being supportable on the cargo platform, the transport frame being pivotally connected to the second frame and pivoting relative to the second frame as the transport platform moves between the retracted and extended positions thereof.

9. The transport accessory of claim 1, further comprising a drive operable to move the transport accessory between a retracted position, in which the second frame is in the retracted position thereof, the carriage and support frame and transport platform are in the substantially horizontal position, and in the retracted position thereof, and an extended position, in which the second frame is in the extended position thereof, the carriage and support frame are in the inclined position thereof, whereby as said support frame inclines said transport platform telescopically extends to the underlying surface and the transport platform is in the extended position thereof, the cargo being loadable and unloadable from the transport platform when the transport accessory is in the extended substantially horizontal position with the underlying surface.

10. The transport accessory of claim 9, wherein the drive includes a drum and a cable having a first end wound around the drum and a second end, and wherein the support frame includes a pair of rotatable pulleys, the transport platform includes a rotatable pulley, and the second frame includes a pulley, the cable extending from the drum, over one of the pair of pulleys of the support frame, at least partially around the pulley of the transport platform, over the other of the pair of pulleys of the support frame, at least partially around the pulley of the second frame and the second end being connected to the support frame.

11. The transport accessory of claim 9, wherein the drive moves the transport accessory from the extended position to the retracted position and the drive facilitates movement of the transport accessory from the retracted position to the extended position under the force of gravity.

12. A transport accessory useable with a vehicle for supporting cargo, the transport accessory having a retracted position, in which the cargo is transportable, and an extended position, in which the cargo is loadable on and unloadable from the transport accessory, the transport accessory comprising:
 a base frame connectable to the vehicle;
 a second frame connected to the base frame and movable therealong between a retracted position to an extended position to a position that has a distal end outside the confines of the vehicle
 a support frame pivotally connected to the distal end of the second frame and including first and second pulleys;
 a transport platform connected to the support frame and movable therealong, the transport platform including a third pulley; and
 a drive operable to move the transport accessory between the refracted position and the extended position, the drive including a drum and a cable windable and unwindable around the drum, the cable extending from the drum and engaging the first, second, and third pulleys.

13. The transport accessory of claim 12, wherein, the support frame is pivotal between a substantially horizontal position and an inclined position relative to the second frame, and the transport platform is movable along the support frame between a refracted position and an extended position, the transport accessory being in the refracted position when the second frame is in the retracted position, the support frame is in the substantially horizontal position and the transport platform is in the retracted substantially horizontal position, and the transport accessory being in the extended position when the second frame is in the extended position, the support frame is in the inclined position and the transport platform is substantially horizontal to the underlying surface extended position.

14. The transport accessory of claim 12, wherein the first and second pulleys are positioned at an end of the support frame.

15. The transport accessory of claim 12, wherein the cable has a first end connected to the drum and a second end extending from the drum, over the first pulley, at least partially around the third pulley, over the second pulley and connected to the second frame.

16. The transport accessory of claim 12, wherein the second frame includes a fourth pulley, the cable having a first end connected to the drum and a second end extending from the drum, over the first pulley, at least partially around the third pulley, over the second pulley, at least partially around the fourth pulley and connected to the support frame.

17. The transport accessory of claim 12, wherein the drive moves the transport accessory from the extended position to the retracted position and the drive facilitates movement of the transport accessory from the retracted position to the extended position under gravity.

18. The transport accessory of claim 12, wherein the support frame includes at least one roller rotatably connected thereto, the transport platform engaging the at least one roller when the transport accessory is in the retracted position and not engaging the roller when the transport accessory is in the extended position.

19. The transport accessory of claim 12, wherein the support frame includes a pair of rollers rotatably connected to each of a first side and a second side of the support frame, the first and second sides being opposite sides of the support frame, each pair of rollers engaging a bottom surface of the transport platform when the transport accessory is in the retracted position and neither pair of rollers engaging the transport platform when the transport accessory is in the extended position.

20. The transport accessory of claim 12, wherein the transport platform includes a trolley interconnected with the support frame and movable therealong, the trolley including at least one roller engageable with the support frame to facilitate rolling engagement of the transport platform with the support frame and at least partially facilitate movement of the transport accessory between the retracted and extended positions.

21. The transport accessory of claim 20, wherein the transport platform also includes a transport frame and a cargo platform connected to the transport frame, the cargo being supportable on the cargo platform, the transport frame being pivotally connected to the trolley and pivoting relative to the trolley as the transport accessory moves between the retracted and extended positions.

22. The transport accessory of claim 12, wherein the support frame includes a pair of support members spaced apart from one another and the transport platform includes a-trolley having at least one roller positioned on each of opposite sides of the trolley, each roller being positioned within a respective one of the support members and rollable therein to facilitate rolling engagement of the transport platform with the support frame and at least partially facilitate movement of the transport accessory between the retracted and extended positions.

23. The transport accessory of claim 12, wherein the transport platform further comprising a moveable rear portion that is substantially coplanar with the transport platform, the moveable rear portion extends the overall length of the transport platform, the moveable rear portion has at least one wheel engageable with the underlying surface to facilitate movement of the transport platform therealong.

24. The transport accessory of claim 12, wherein the transport platform further comprising side walls and rear wall and front wall that are selectively connectable to the transport platform.

25. A method of loading cargo onto a transport accessory useable with a vehicle, the method comprising:
mounting a base frame of the transport accessory to the vehicle;
extending the transport accessory from a retracted position, in which a second frame is substantially nested with the base frame, a carriage and a support frame rigidly connected to one another and rotatable together are in a substantially horizontal position relative to the second frame and a transport platform is substantially horizontal and substantially positioned over the support frame, to an extended position, in which a distal end of the second frame is telescopically extended from the base frame to extend out and away from the confines of the vehicle, the carriage and support frame are inclined relative to the underlying surface and the transport platform is telescopically and pivotally extended from the support frame and is substantially horizontal with the underlying surface; and
loading or unloading the transport platform with the cargo.

26. The method of claim 25, wherein the support frame includes at least one roller rotatably mounted to each of opposite sides of the support frame, the transport platform engaging the rollers in the retracted position of the transport accessory and not engaging the rollers in the extended position of the transport accessory, the transport platform rolling along the rollers during at least partial movement of the transport accessory from the retracted position to the extended position.

27. The method of claim 25, further comprising activating a drive to facilitate extending of the transport accessory from the retracted position to the extended position.

28. The method of claim 27, wherein activating a drive includes activating a drive a first time, the method further comprising activating the drive a second time to move the transport accessory from the extended position to the retracted position after the cargo has been loaded onto the transport platform.

29. The method of claim 25, wherein the drive includes a drum that is operable to rotate in both clockwise and counter-clockwise directions to wind a cable thereon, the cable having a first end mounted to the drum and a second end, the cable being engageable with the support frame, transport platform and the second frame.

30. The method of claim 29, wherein the support frame includes first and second pulleys, the transport platform includes a third pulley and the second frame includes a fourth pulley, the cable extending from the drum, over the first pulley, at least partially around the third pulley, over the second pulley, at least partially around the fourth pulley and the second end of the cable being connected to the support frame.

* * * * *